United States Patent
Cho et al.

(10) Patent No.: US 9,542,041 B2
(45) Date of Patent: Jan. 10, 2017

(54) DIGITAL DEVICE PROVIDING A TOUCH COMPENSATION AND METHOD OF CONTROLLING THEREFOR

(71) Applicant: LG ELECTRONICS INC., Seoul (KR)

(72) Inventors: Eunhyung Cho, Seoul (KR); Doyoung Lee, Seoul (KR); Jongho Kim, Seoul (KR); Sinae Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 64 days.

(21) Appl. No.: 14/282,079

(22) Filed: May 20, 2014

(65) Prior Publication Data

US 2015/0277599 A1    Oct. 1, 2015

(30) Foreign Application Priority Data

Mar. 25, 2014  (KR) .......................... 10-2014-0034720

(51) Int. Cl.
*G06F 3/041*    (2006.01)
*G06F 3/01*    (2006.01)

(52) U.S. Cl.
CPC ............. *G06F 3/0418* (2013.01); *G06F 3/013* (2013.01); *G06F 3/041* (2013.01); *G06F 3/0412* (2013.01)

(58) Field of Classification Search
CPC ................... G06F 3/0418; G06F 2203/04101; G06F 3/0488–3/04883; G06F 3/041–3/0412; G06F 3/013; G06F 3/03545

See application file for complete search history.

(56) References Cited

U.S. PATENT DOCUMENTS

| | | | | |
|---|---|---|---|---|
| 5,621,438 A | * | 4/1997 | Kamimura | G06F 1/1613 345/156 |
| 6,415,138 B2 | * | 7/2002 | Sirola | G06F 1/1626 345/173 |
| 7,079,119 B2 | * | 7/2006 | Hanson | G06F 1/1613 345/173 |
| 8,947,397 B2 | * | 2/2015 | Fujii | G06F 3/0418 345/174 |
| 9,128,545 B2 | * | 9/2015 | Wilson | G06F 3/041 |
| 2005/0162411 A1 | * | 7/2005 | Berkel van | G06F 3/03545 345/179 |

(Continued)

FOREIGN PATENT DOCUMENTS

WO    WO 2010/126756 A2    11/2010

*Primary Examiner* — Sanjiv D Patel
(74) *Attorney, Agent, or Firm* — Birch, Stewart, Kolasch & Birch, LLP

(57) ABSTRACT

The present specification relates to a digital device and a method of controlling therefor. According to one embodiment, the digital device includes a touch sensitive display unit configured to detect a touch input, a transparent cover unit, which is positioned in an open position or a closed position and overlapped with the touch sensitive display unit in the closed position and a processor configured to control the touch sensitive display unit, the processor is further configured to detect the touch input on a first position of the touch sensitive display unit, when the transparent cover unit is in the open position, alter location information of the touch input detected on the first position to a second position, when the transparent cover unit is in the closed position, alter the location information of the touch input detected on the first position to a third position.

18 Claims, 19 Drawing Sheets

Front View

Top View

(56) References Cited

U.S. PATENT DOCUMENTS

| | | | |
|---|---|---|---|
| 2010/0107099 A1* | 4/2010 | Frazier | G06F 3/044 |
| | | | 715/765 |
| 2011/0285657 A1* | 11/2011 | Shimotani | G06F 3/0416 |
| | | | 345/173 |
| 2012/0032896 A1* | 2/2012 | Vesely | G06F 3/005 |
| | | | 345/173 |
| 2012/0144298 A1 | 6/2012 | Karlsson | |
| 2012/0162099 A1* | 6/2012 | Yoo | G06F 3/0412 |
| | | | 345/173 |
| 2013/0138378 A1 | 5/2013 | Chang et al. | |
| 2013/0314338 A1* | 11/2013 | Nam | G06F 3/041 |
| | | | 345/173 |
| 2014/0015811 A1* | 1/2014 | Ji | G06F 3/033 |
| | | | 345/179 |
| 2014/0267178 A1* | 9/2014 | Bathiche | G06F 3/0488 |
| | | | 345/178 |

* cited by examiner

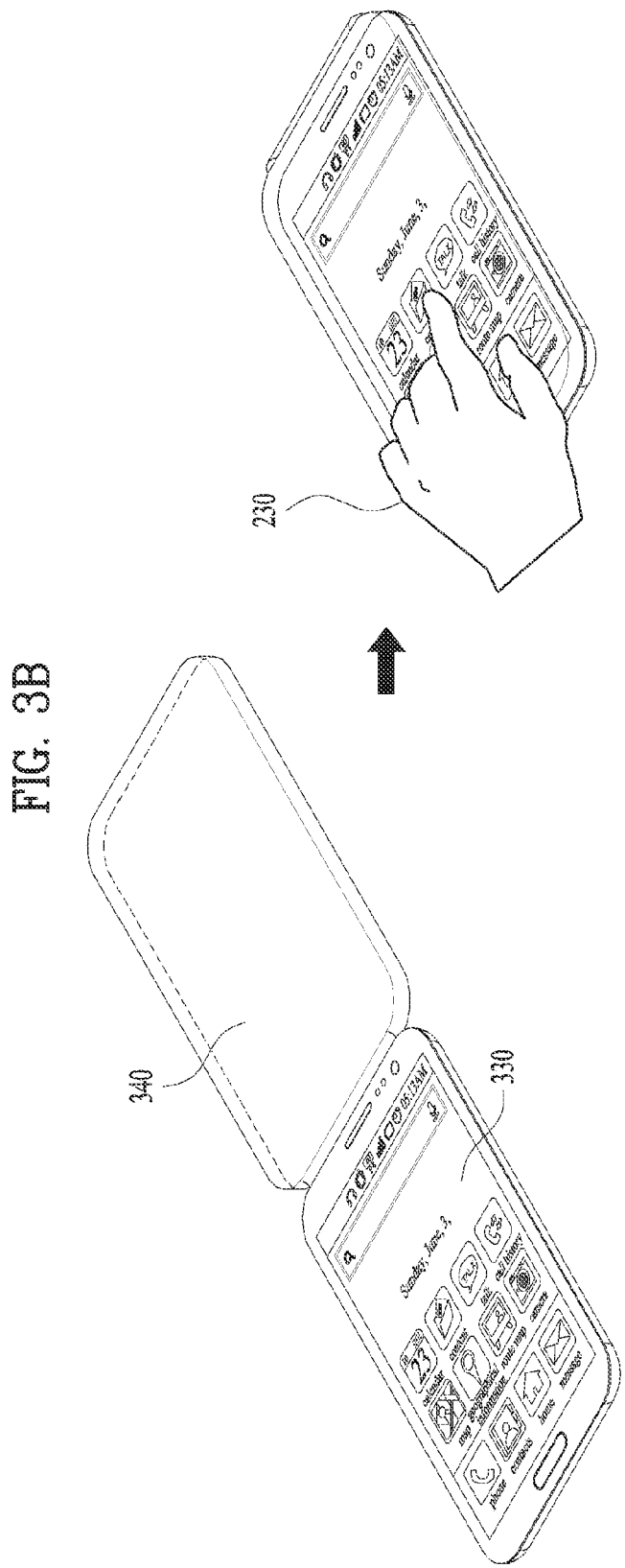

Front View

Top View

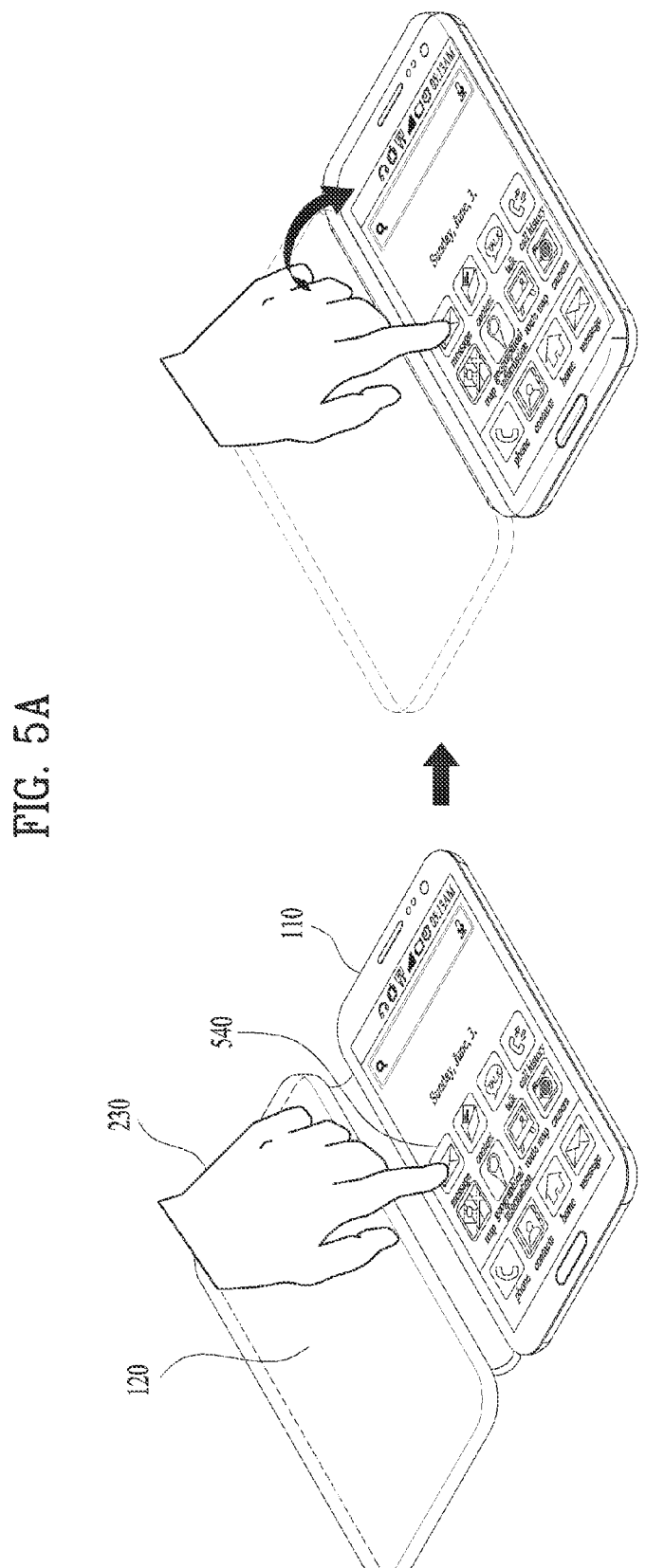

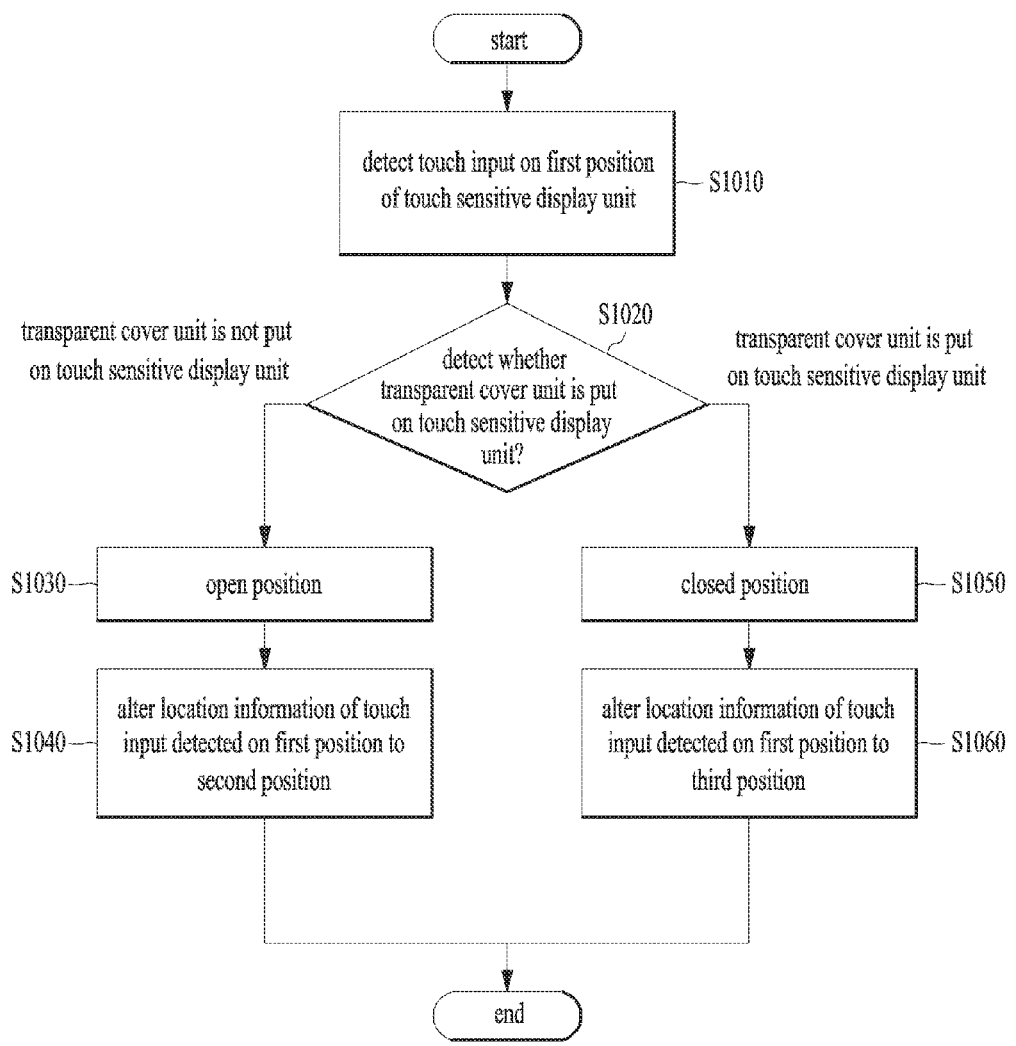

DIGITAL DEVICE PROVIDING A TOUCH COMPENSATION AND METHOD OF CONTROLLING THEREFOR

This application claims the benefit of the Korean Patent Application No. 10-2014-0034720, filed on Mar. 25, 2014, which is hereby incorporated by reference as if fully set forth herein.

BACKGROUND OF THE INVENTION

Field of the Invention

The present specification relates to a digital device providing touch compensation and a method of controlling therefor, and more particularly, to a method for the digital device to compensate sensitivity and a position of a touch input according to whether a transparent cover unit is overlapped with a touch sensitive display unit.

Discussion of the Related Art

A digital device can provide a user with visual information using a display unit. Recently, such various digital devices possessing functions as good as a desktop computer as a smartphone, a smart pad, and the like are on sale. In relation to this, the digital device has enabled a control input of a user to be detected by a touch input. A legacy digital device used to detect the control input of the user using such an input device as a keyboard, a mouse, a keypad. Yet, since a size and weight of the digital device is reduced, the digital device becomes available while the user is moving with the digital device in hand. In consideration of these trends, the digital device provides visual information to the user using a touch sensitive display unit and detects the control input of the user with the display unit at the same time. By doing so, the digital device does not need a separate input device for detecting a control input any more. And, since the digital device is manufactured in foldable fashion, the user can easily carry the digital device.

The user can touch the touch sensitive display unit according to a gaze of the user gazing the touch sensitive display unit. The user can control the digital device in various distances and angles. In this case, the user may touch a point different from a point at which the gaze of the user arrives according to a distance between the digital device and the user or an angle between the digital device and the user. Hence, it is necessary for the digital device to adjust a touch point recognized by the gaze of the user and a touch point actually touched by the user. And, if a foldable digital device is manufactured and a touch input is detected in a state that the foldable digital device is folded, an error between the touch point recognized by the gaze of the user and the touch point actually touched by the user may be getting bigger. Hence, it is required to have a method of compensating the error.

SUMMARY OF THE INVENTION

The present specification intends to provide a digital device providing touch compensation and a method of controlling therefor.

An object of the present specification is to provide a method for a digital device to configure touch compensation according to whether a transparent cover unit and a touch sensitive display unit overlap each other.

When a touch sensitive display unit and a transparent cover unit overlap each other, another object of the present specification is to provide a method for a digital device to additionally execute compensation based on the transparent cover unit.

Another object of the present specification is to provide a method for a digital device to execute touch compensation based on a position in which visual information is displayed.

Another object of the present specification is to provide a method for a digital device to detect a position in which visual information is displayed based on a predetermined reference point.

Another object of the present specification is to provide a method for a digital device to execute touch compensation based on an angle of a finger of a user touching visual information.

Another object of the present specification is to provide a method for a digital device to configure touch sensitivity according to whether a touch sensitive display unit and a transparent cover unit overlap each other.

Another object of the present specification is to provide a method for a digital device to detect an input with a transparent cover unit.

The other object of the present specification is to provide a method for a digital device to control visual information displayed in a touch sensitive display unit and visual information displayed in a transparent cover unit, respectively.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a digital device includes a touch sensitive display unit configured to detect a touch input, a transparent cover unit, which is positioned at in open position or a closed position and overlapped with the touch sensitive display unit in the closed position and a processor configured to control the touch sensitive display unit, wherein the processor is further configured to: detect the touch input on a first position of the touch sensitive display unit, when the transparent cover unit is in the open position, alter location information of the touch input detected on the first position to a second position, when the transparent cover unit is in the closed position, alter the location information of the touch input detected on the first position to a third position.

Accordingly, the present specification provides the following effects or advantages.

According to the present specification, a digital device providing touch compensation and a method of controlling therefor can be provided.

In particular, a digital device can differently configure touch compensation according to whether a transparent cover unit and a touch sensitive display unit overlap each other.

When a touch sensitive display unit and a transparent cover unit overlap each other, a digital device can additionally execute compensation based on the transparent cover unit.

A digital device can execute touch compensation based on a position in which visual information is displayed.

A digital device can detect a position in which visual information is displayed based on a predetermined reference point.

A digital device can execute touch compensation based on an angle of a finger of a user touching visual information.

A digital device can configure touch sensitivity according to whether a touch sensitive display unit and a transparent cover unit overlap each other.

A digital device can detect an input with a transparent cover unit.

A digital device can control visual information displayed in a touch sensitive display unit and visual information displayed in a transparent cover unit, respectively.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3a to FIG. 3c is a diagram for a digital device including a transparent cover unit according to one embodiment of the present specification;

FIG. 5a to FIG. 5c is a diagram for a method for a digital device to execute touch compensation in an open position and a closed position according to one embodiment of the present specification;

FIG. 10 is a flowchart for a digital device to execute touch compensation according to one embodiment of the present specification.

DETAILED DESCRIPTION OF THE INVENTION

While embodiments have been described in detail with reference to the attached drawings and contents written on the drawings, the scope of claims may be non-restricted or non-limited by the embodiments.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

In the present specification, a digital device 100 may correspond to an electronic device detecting a user input and displaying visual information with a display unit. More specifically, the digital device 100 may correspond to a smartphone, a smart pad, a tablet computer, a notebook, or a PDA. And, the digital device 100 may correspond to a device detecting a control input of a user and displaying visual information, by which the present specification may be non-limited.

Figure 1:
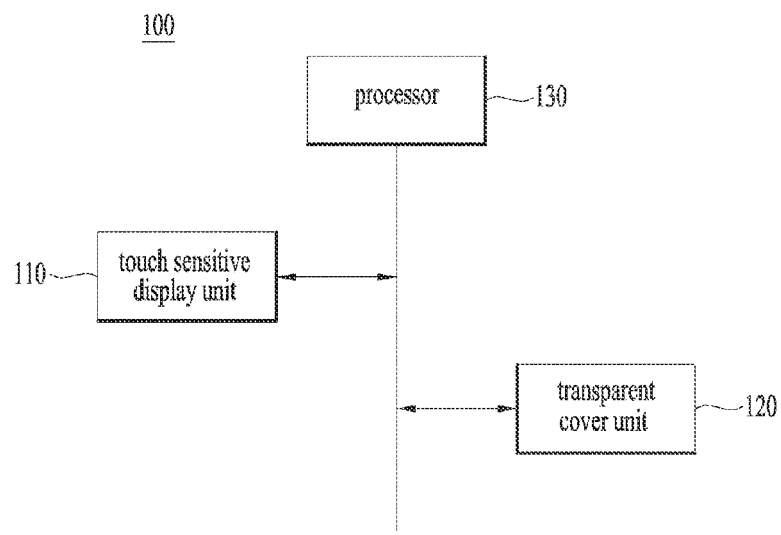
FIG. 1 is a block diagram for a digital device according to one embodiment of the present specification.

FIG. 1 is a block diagram for a digital device 100 according to one embodiment of the present specification. The digital device 100 can include a touch sensitive display unit 110, a transparent cover unit 120 and a processor 130. The touch sensitive display unit 110 can display visual information. The touch sensitive display unit 110 can detect a touch input of a user. According to embodiment, the touch sensitive display unit 110 can include at least one selected from the group consisting of an OLED (organic light-emitting diode), a LCD (liquid crystal display), an E-ink, an HMD (head mounted display) and a flexible display. The touch sensitive display unit 110 can detect a touch input as a control input using a touch sensor.

As an example, the touch sensitive display unit 110 can consist of a display unit displaying visual information and a touch sensor detecting a touch input, respectively. More specifically, the digital device 100 can display visual information delivered from the processor 130 in the display unit. The digital device 100 can detect a touch input of a user using the touch sensor. The touch sensor can deliver the touch input of the user to the processor 130.

The transparent cover unit 120 and the display unit can overlap each other. In this case, the digital device 100 can detect a touch input using the touch sensitive display unit 110 in a state that the transparent cover unit 120 is overlapped. And, the digital device 100 can detect a touch input for controlling visual information displayed in the touch sensitive display unit 110 in the state that the transparent cover unit 120 is overlapped. In this case, as an example, the transparent cover unit 120 may correspond to a transparent plastic cover. And, the transparent cover unit 120 may correspond to a cover made from a transparent flexible material. And, the transparent cover unit 120 may correspond to a cover made from a transparent film material. And, the transparent cover unit 120 may correspond to a component connected with the touch sensitive display unit 110 by a folding unit. In this case, the folding unit may correspond to a part connecting the touch sensitive display unit 110 and the transparent cover unit 120 in the digital device, which is manufactured in foldable fashion. In particular, the transparent cover unit 120 may correspond to a cover made from a transparent material and capable of being overlapped with the display unit 120, by which the present specification may be non-limited.

And, the transparent cover unit 120 may correspond to a touch sensitive transparent cover unit displaying visual information and detecting a touch input of a user. More specifically, the transparent cover unit 120 can detect a touch input irrespective of the touch sensitive display unit 110. And, the transparent cover unit 120 can display visual information irrespective of the touch sensitive display unit 110. In this case, as an example, the touch sensitive display unit 110 and the transparent cover unit 120 may include a separate touch sensor, respectively. And, as an example, the digital device 100 includes a single touch sensor and can detect a touch input touching the display unit 110 and a touch input touching the transparent cover unit 120, respectively. The digital device 100 divides the touch inputs into the touch input touching the display unit 110 and the touch input touching the transparent cover unit 120 and can detect the touch inputs as control inputs different from each other.

And, as an example, the touch sensitive display unit 110 and the transparent cover unit 120 can be configured as a single flexible display unit. Regarding this, it shall be described later with reference to FIG. 3c.

The processor 130 receives a touch input of a user and can execute compensation for the touch input. And, the processor 130 can control sensitivity for the touch input of the user. More specifically, in case of an open position, the processor 130 can execute compensation for a touch input touching the touch sensitive display unit 110. In this case, the open position may correspond to a state that the touch sensitive display unit 110 and the transparent cover unit 120 do not overlap each other. In particular, the processor 130 can detect a touch input directly touching the surface of the touch sensitive display unit 110 in the open position.

In case of a closed position, the processor 130 can execute compensation for a touch input touching the touch sensitive display unit 110. In this case, the closed position may correspond to a state that the transparent cover unit 120 is put onto the top of the touch sensitive display unit 110. In particular, the processor 130 can determine either the open position or the closed position according to whether the transparent cover unit is put onto the top of the touch sensitive display unit 110.

The processor 130 can compensate for a touch input touching the touch sensitive display unit 110 based on a thickness of the transparent cover unit 110. More specifically, in case that the processor 130 executes compensation for the touch input in the closed position, the processor 130 can execute touch compensation in a manner of adding compensation, which is executed based on the thickness of the transparent cover unit 110 in the open position, to the touch compensation.

The processor 130 can differently configure sensitivity for a touch input touched by a user. More specifically, the processor 130 can detect the touch input by first sensitivity in the open position. The processor 130 can detect the touch input by second sensitivity in the closed position. In this case, the processor 130 can configure the second sensitivity to have higher sensitivity compared to the first sensitivity. In particular, the processor 130 can more sensitively detect the touch input in the closed position. Regarding this, it shall be described later with reference to FIG. 5c.

And, the aforementioned sensors are included in the digital device 100 as a separate element or may be included in the digital device in a manner of being integrated into at least one element.

Figure 2A:
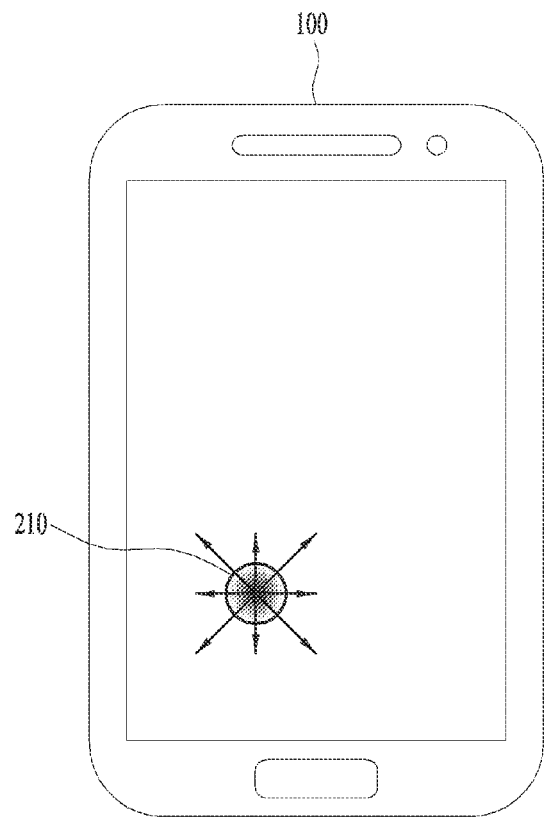
FIG. 2a to FIG. 2c is a diagram for a method for a digital device to execute compensation according to one embodiment of the present specification.
Figure 2B:
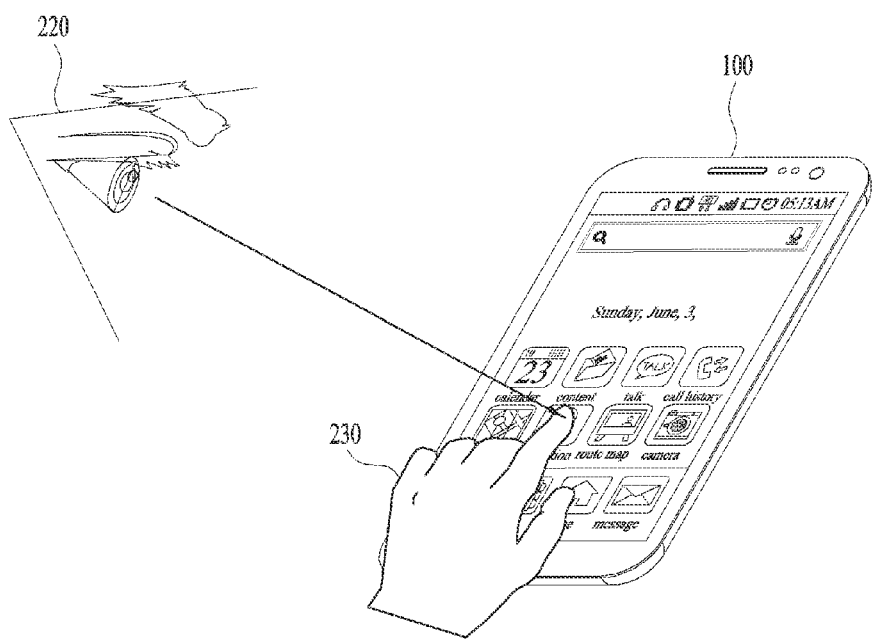
Figure 2C:
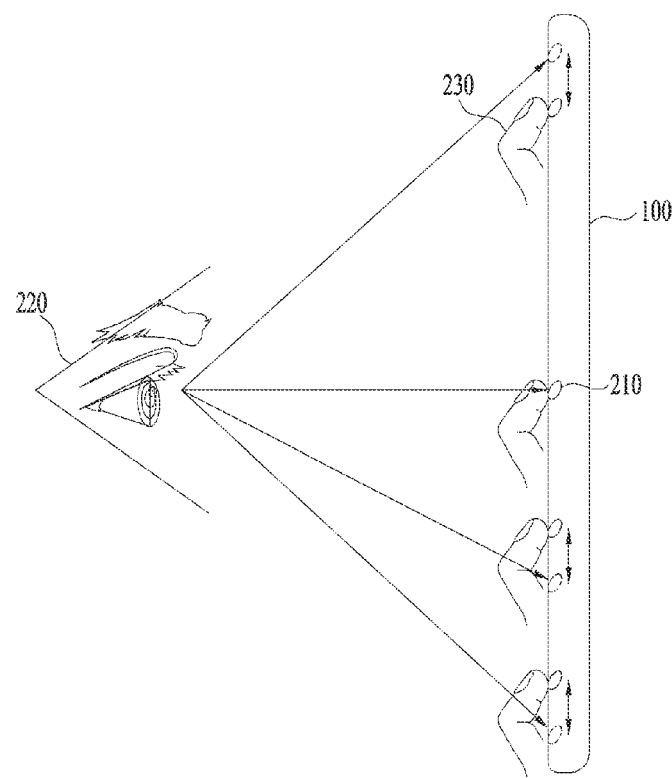

FIG. 2a to FIG. 2c is a diagram for a method for a digital device to execute compensation according to one embodiment of the present specification. The digital device 100 can execute touch compensation according to a position on which a touch input is detected in the touch sensitive display unit 110. In this case, the digital device 100 can determine the position on which the touch input is detected on the basis of a reference point 210. And, the digital device 100 can execute the touch compensation based on a direction on which the touch input is detected on the basis of the reference point 210. In this case, the reference point 210 may correspond to a point where the compensation for the touch input is not executed. As an example, the reference point 210 can be configured by a position where an angle formed by a gaze of eyes 220 of a user and the digital device 100 is within a threshold angle range. In this case, the threshold angle range may include a right angle as the threshold angle range. More specifically, the digital device 100 can configure a prescribed range where the gaze of the user and the digital device 100 form a right angle as the reference point 210. As an example, the reference point 210 may correspond to a point where there is no error between a position detected by the eyes 220 of the user and a position touched by a hand 230 of the user. In particular, in case that the user touches while gazing visual information, the user may touch a point identical to a point at which the user is gazing. Hence, the digital device 100 may not compensate for the touch input touched by the user in the reference point 210. And, as an example, the reference point 210 may correspond to a position configured by the user or the digital device 100. The user can differently configure the reference point 210 in consideration of a position of the gaze of the user and characteristics of the user. And, the digital device 100 can configure the reference point 210 with a predetermined value. In this case, as an example, the digital device 100 can configure the reference point 210 in consideration of characteristics of the user for the use of the device.

The digital device 100 can detect a position on which a touch input is detected based on the reference point 210. In this case, if the position on which the touch input is detected is far from the reference point 210, the digital device 100 may execute more touch compensations. More specifically, if the position on which the touch input is detected is far from the reference point 210, the digital device 100 can detect a touch input of the user in a position far from the position on which the touch input is detected. Regarding this, it shall be described later with reference to FIG. 6a.

Figure 3A:
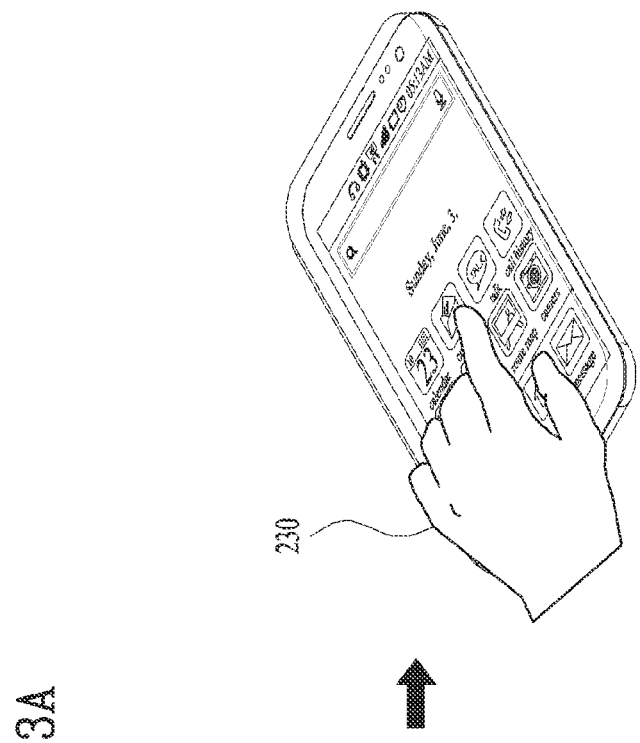
Figure 3A:
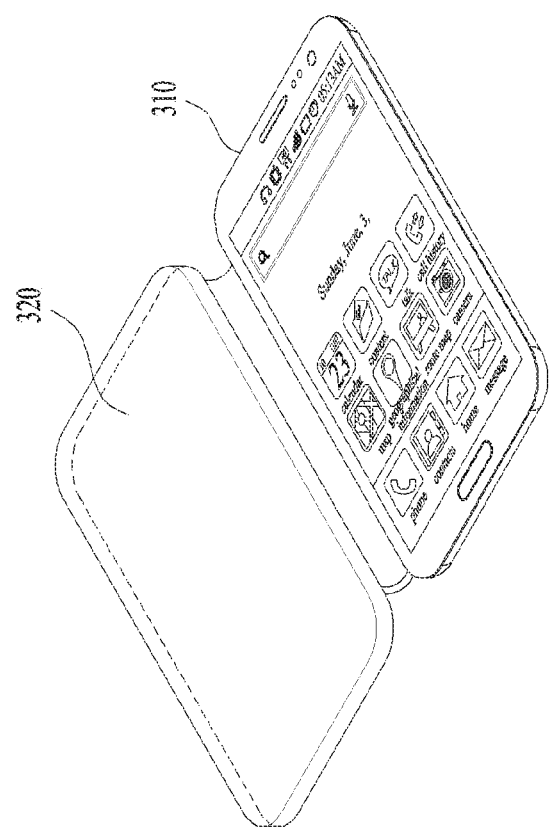
Figure 3C:
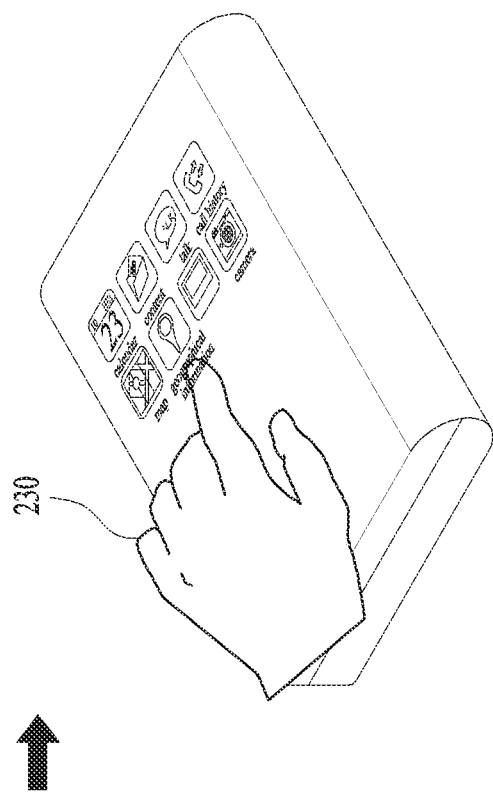
Figure 3C:
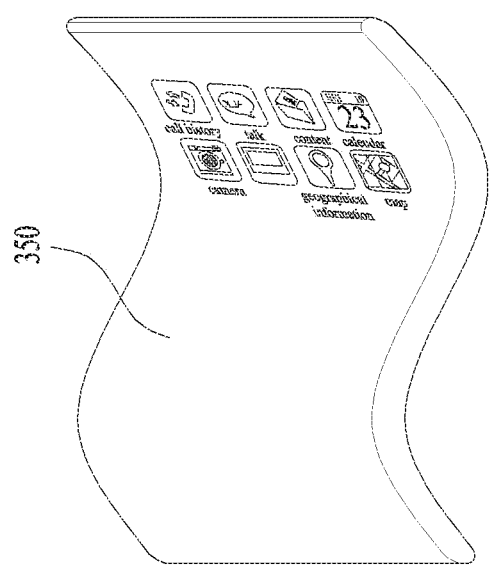

FIG. 3a to FIG. 3c is a diagram for a digital device including a transparent cover unit according to one embodiment of the present specification.

As mentioned in the foregoing description, the digital device 100 can execute touch compensation for a touch input of a user. In this case, if the transparent cover unit 120 and the touch sensitive display unit 110 overlap each other, the digital device 100 can execute the touch compensation in a manner of adding compensation, which is executed based on a thickness of the transparent cover unit 120, to the touch compensation. In particular, the digital device 100 can execute the touch compensation in consideration of the transparent cover unit 120.

In this case, as an example, referring to FIG. 3a, the digital device 100 can include the touch sensitive display unit 110 and the transparent cover unit 320 capable of being folded to the top of the touch sensitive display unit 110. In this case, the transparent cover unit 320 can be attached to the right side or the left side of the digital device 100. A user can fold the transparent cover unit 320 onto the top of the touch sensitive display unit 110 on the basis of a part to which the transparent cover unit 320 is attached.

And, as an example, referring to FIG. 3b, the transparent cover unit 340 can be attached to the top or the bottom of the digital device 100. A user can fold the transparent cover unit 340 onto the top of the touch sensitive display unit 110 on the basis of a part to which the transparent cover unit 340 is attached.

In particular, the transparent cover unit 120 may correspond to a part capable of being overlapped with the display unit 110 in a manner of being folded in a foldable digital display 100, by which the present specification may be non-limited. And, as an example, the transparent cover unit 120 may correspond to a film form attached to the top of the digital device 100.

And, as an example, referring to FIG. 3c, the digital device 100 can include the touch sensitive display unit 110 and the transparent cover unit 120 as a single flexible display unit 350. The digital device 100 can display visual information in the flexible display unit 350. In this case, if the flexible display unit 350 is folded and overlapped each other, the digital device 100 can execute touch compensation based on the folded flexible display unit 350. More specifically, if the flexible display unit 350 is not overlapped each other since the flexible display unit is unfolded, the digital device 100 can configure it as an open position. In this case, if the digital device 100 detects a touch input touching the flexible display unit 350, the digital device 100 can execute touch compensation for the flexible display unit 350. And, if the flexible display unit 350 is overlapped each other since the flexible display unit is folded, the digital device 100 can configure it as a closed position. In this case, if the digital device 100 executes touch compensation for an input touching the flexible display unit 350, the digital device 100 can execute the touch compensation in a manner of adding compensation, which is executed based on an area where the flexible display unit 350 is overlapped, to the touch compensation. In particular, the digital device 100 can execute the touch compensation in consideration of a thickness of the area where the flexible display unit 350 is overlapped.

Figure 4:
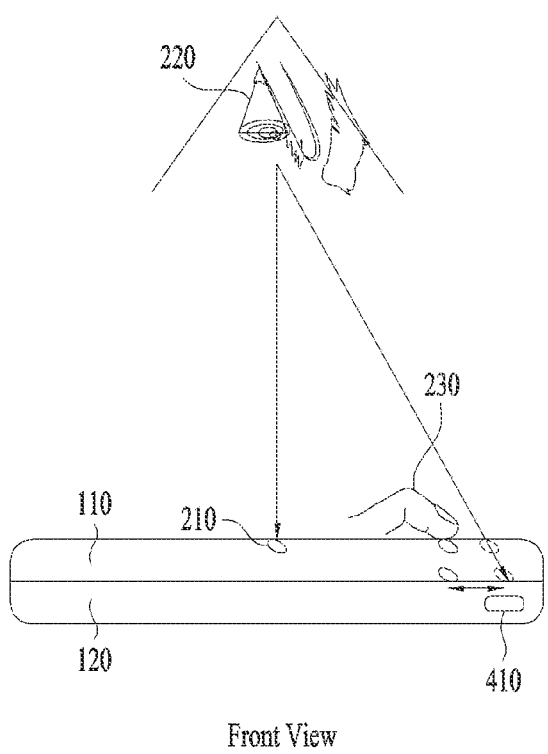
FIG. 4 is a diagram for a position of a touch input detected by a digital device including a transparent cover unit according to one embodiment of the present specification.
Figure 4:
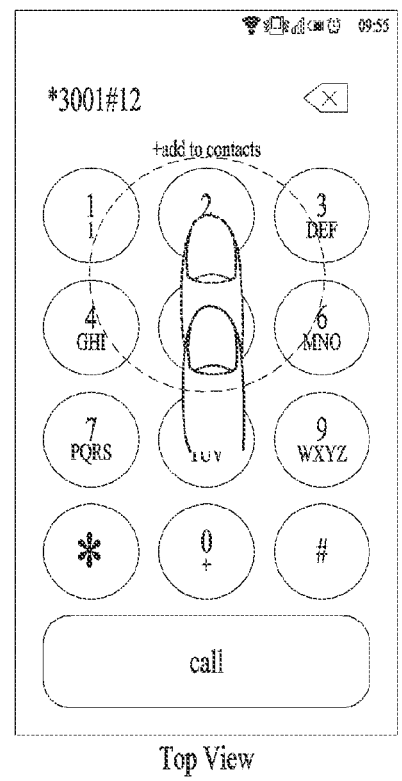

FIG. 4 is a diagram for a position of a touch input detected by a digital device including a transparent cover unit according to one embodiment of the present specification.

A user can touch a position different from a point at which eyes 220 of the user are gazing. If the transparent cover unit 120 and the display unit 110 do not overlap each other, the digital device 100 can configure it as an open position. And, if the transparent cover unit 120 and the display unit 110 overlap each other, the digital device 100 can configure it as a closed position. In this case, if the user touches the digital device 100, the user may touch a position different from a position at which the eyes 220 of the user are gazing. And, if the digital device 100 is configured with the closed position, a difference between the position at which the eyes 220 of the user are gazing and the point touched by the user may be getting bigger due to a thickness of the transparent cover unit 120.

More specifically, the user can detect visual information 410 by the eyes 220 of the user. In this case, the user can touch the visual information 410 detected by the eyes 220 of the user. If the transparent cover unit 120 and the touch sensitive display unit 110 overlap each other, the user may touch the top of the transparent cover unit 120 by a hand 230 of the user. In particular, the user can touch the top of the transparent cover unit 120 to control the visual information 410 displayed in the touch sensitive display unit 110 situating at the bottom of the transparent cover unit 120. In this case, the user can touch a point apart from a point at which the visual information 410 is located as much as a first distance due to the thickness of the transparent cover unit 120. More specifically, as an example, although the user touches while gazing a '2' part, the hand 230 of the user may touch a '5' part. Hence, the digital device 100 can execute touch compensation for a touch input touching the '2' part at which the user is gazing. In this case, the aforementioned first distance may be getting longer as the thickness of the transparent cover unit 120 becomes thicker. And, as an example, the first distance may vary according to a position in which the visual information 410 is displayed. In this case, the position in which the visual information 410 is displayed can be detected on the basis of the reference point 210.

Figure 5B:
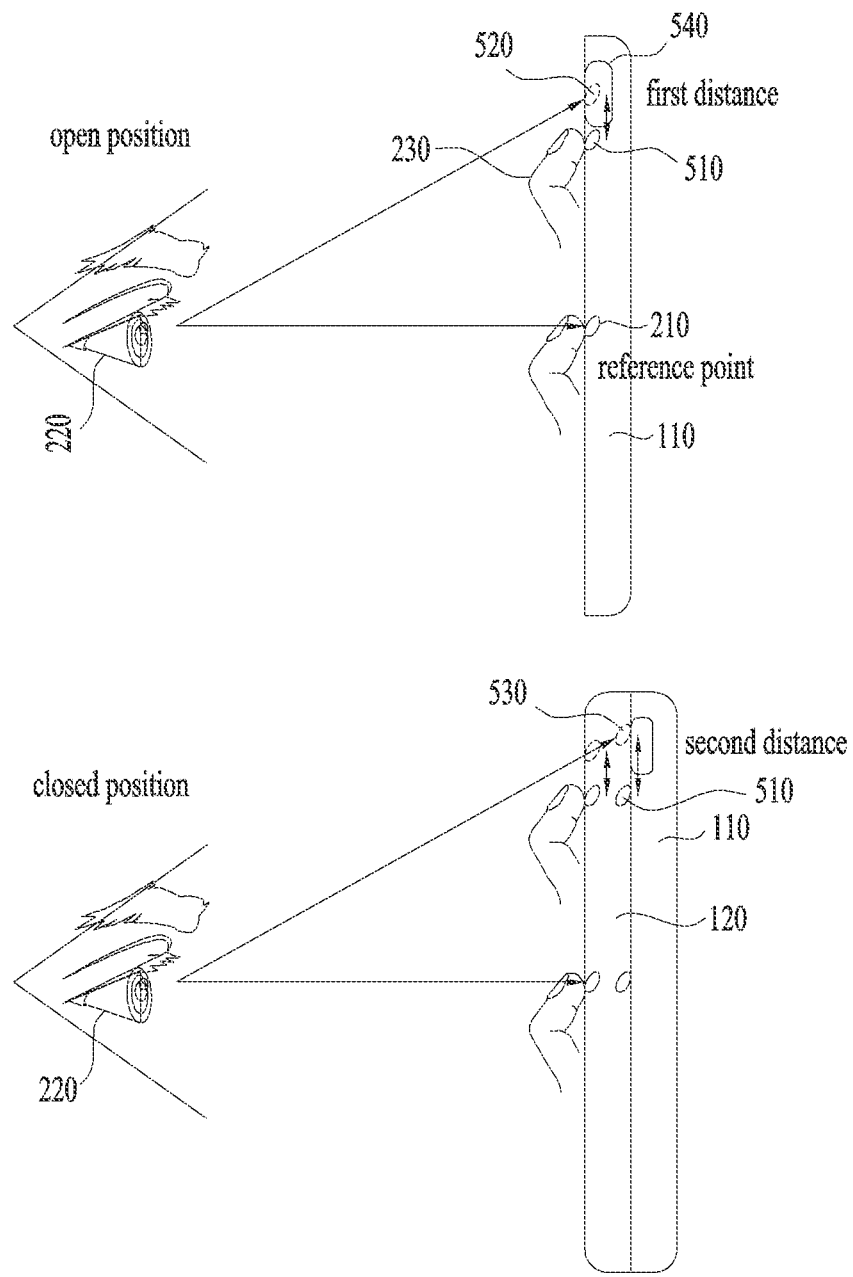
Figure 5C:
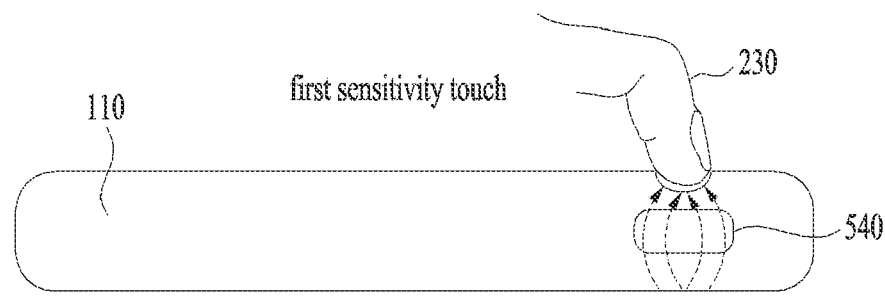
Figure 5C:
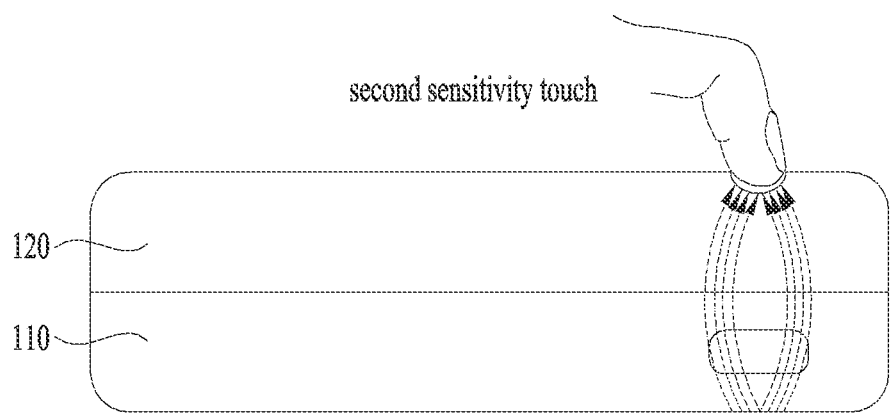

FIG. 5a to FIG. 5c is a diagram for a method for a digital device to execute touch compensation in an open position and a closed position according to one embodiment of the present specification.

The digital device 100 includes the transparent cover unit 120. If the transparent cover unit 120 and the touch sensitive display unit 110 do not overlap each other, the digital device 100 can configure it as an open position. In this case, the open position may correspond to a mode for detecting a touch input touching the touch sensitive display unit 110 in a state that the transparent cover unit 120 is not overlapped with the touch sensitive display unit. In particular, the digital device 100 can detect a touch input directly touching the top of the touch sensitive display unit 110. And, if the transparent cover unit 120 and the touch sensitive display unit 110 overlap each other, the digital device 100 can configure it as a closed position. In this case, the closed position may correspond to a mode for detecting a touch input touching the touch sensitive display unit 110 in a state that the transparent cover unit 120 is overlapped with the touch sensitive display unit. In particular, the digital device 100 can detect a touch input touching the transparent cover unit 120 situating at the top of the touch sensitive display unit 110.

In this case, the digital device 100 can differently configure touch compensation in the open position and the touch compensation in the closed position. More specifically, if the touch compensation is configured by the open position, the digital device 100 can execute the touch compensation based on a position on which a touch input touching the touch sensitive display unit 110 is detected. On the contrary, if the touch compensation is configured by the closed position, the digital device 100 can execute the touch compensation based on a position of the touch input touching the touch sensitive display unit 110. In this case, the digital device 100 can execute the compensation based on the transparent cover unit 120. More specifically, the digital device 100 can additionally execute compensation in the closed position in consideration of the thickness of the transparent cover unit 120. In particular, the digital device 100 can execute the compensation based on the position on which the touch input is detected in the open position. And, the digital device 100 can execute the compensation based on the position on which the input is detected in the closed position and the compensation based on the thickness of the transparent cover unit.

And, the digital device 100 can differently configure touch sensitivity in the open position and the touch sensitivity in the closed position. In this case, the sensitivity may correspond to sensitivity of a sensor of the digital device 100, which detects a touch input. More specifically, if the sensitivity is configured by the open position, the digital device 100 can detect a touch input touching the touch sensitive display unit 110 by a first sensitivity. On the contrary, if the sensitivity is configured by the closed position, the digital device 100 can detect the touch input touching the touch sensitive display unit 110 by a second sensitivity. In this case, the second sensitivity may be higher than the first sensitivity.

More specifically, the digital device 100 can detect a touch input of a user via the touch sensitive display unit 110. In this case, if the touch sensitive display unit is configured by the open position, the digital device 100 can detect a touch input directly touching the top of the touch sensitive display unit 110. On the contrary, if the touch sensitive display unit is configured by the closed position, the digital device 100 can detect a touch input of a user touching the transparent cover unit 120, which is situating at the top of the touch sensitive display unit 110. In particular, the touch input of the user can be detected in the open position with higher strength compared to the closed position. Hence, the digital device 100 can increase the sensitivity of the touch input detected in the closed position. By doing so, the digital device 100 can supplement strength of the touch input reduced by the transparent cover unit 120. And, as an example, if a thickness of the transparent cover unit 120 increases, the digital device 100 can increase the second sensitivity. In particular, the digital device 100 can control the second sensitivity based on the thickness of the transparent cover unit 120.

As an example, referring to FIG. 5a, if the transparent cover unit 120 is not put onto the top of the touch sensitive display unit 110, the digital device 100 can configure it as the open position. In particular, the digital device 100 can detect a touch input touching the touch sensitive display unit 110 in a state that the transparent cover unit 120 is unfolded. On the contrary, if the transparent cover unit 120 is put onto the top of the touch sensitive display unit 110, the digital device 100 can configure it as the closed position. In particular, the digital device 100 can detect the touch input touching the touch sensitive display unit 110 in a state that the transparent cover unit 120 is folded onto the top of the touch sensitive display unit 110. In this case, the digital device 100 can detect the touch input touching the top of the transparent cover unit 120 by the touch sensitive display unit 110.

Referring to FIG. 5b, if the digital device is configured by the open position, the digital device 100 can detect a touch input touching a first position 510. The digital device 100 can alter location information of the touch input detected on the first position 510 to a second position 520. More specifically, the digital device 100 can display first visual information 540 in the second position 520. In this case, a user can touch a touch input for controlling the first visual information 540 in the first position 510. More specifically, the user may touch a position different from a position at which the user is gazing due to an angle formed by the digital device 100 and a gaze of the user. Hence, the digital device 100 can execute touch compensation, which alters the location information of the touch input detected on the first position 510 to the second position 520. In this case, the second position 520 may correspond to a position apart from the first position 510 as much as a first distance. As the distance between the first position 510 and the reference point 210 increases, the digital device 100 can increase the first distance. And, the second position 520 may correspond to a position apart from the first position 510 as much as the first distance in a first direction. In this case, the first direction may correspond to a direction receding from the reference point 210. More specifically, the first direction is a direction identical to a direction of a straight line formed by the reference point 210, the first position 510, and the second position 520. In particular, the first direction and the first distance can be determined based on the reference point 210.

And, if the digital device is configured by the closed position, the digital device 100 can alter location information of the touch input detected on the first position 510 to a third position 530. More specifically, the digital device 100 can display first visual information 540 in the third position 530. In this case, a user can touch a touch input for controlling the first visual information 540 in the first position 510. More specifically, the user may touch a position different from a position at which the user is gazing due to an angle formed by the digital device 100 and a gaze of the user. And, the user may touch a position different from the position at which the user is gazing due to a thickness of the transparent cover unit 120 in the closed position. Hence, the digital device 100 can execute touch compensation, which alters the location information of the touch input detected on the first position 510 to the third position 530. In this case, the third position 530 may correspond to a position apart from the first position 510 as much as a second distance. As the distance between the first position 510 and the reference point 210 increases, the digital device 100 can increase the second distance. And, the third position 530 may correspond to a position apart from the first position 510 as much as the second distance in a first direction. In this case, the first direction may correspond to a direction receding from the reference point 210. More specifically, the first direction is a direction identical to a direction of a straight line formed by the reference point 210, the first position 510, and the third position 530. In particular, the first direction and the first distance can be determined based on the reference point 210. And, the digital device 100 can configure the second distance corresponding to the distance between the third position 530 and the first position 510 to be greater than the first distance corresponding to the distance between the second position 520 and the first position. More specifically, the second distance can be configured to be longer than the first distance because the digital device detects the touch input touching the top of the transparent cover unit 120 in the closed position. In this case, as an example, as the thickness of the transparent cover unit 120 increases, the digital device can increase the distance between the third position 530 and the first position 510.

And, as an example, if it is configured by the open position, the digital device 100 can identically configure the first position 510 from the reference point 210 and the compensated second position 520 from the reference point 210. If it is configured by the closed position, the digital device 100 can identically configure the first position 510 from the reference point 210 and the compensated third position 520 from the reference point 210. In particular, the digital device 100 may not execute touch compensation in the reference point 210.

Referring to FIG. 5c, if it is configured by the open position, the digital device 100 can detect a touch input by a first sensitivity. If it is configured by the closed position, the digital device 100 can detect a touch input by a second sensitivity. In this case, the second touch sensitivity may correspond to sensitivity higher than the first touch sensitivity. More specifically, if the digital device is configured by the closed position, the digital device 100 can detect a touch input based on a thickness of the transparent cover unit 120. The digital device 100 can detect a touch input touching the top of the transparent cover unit 120 by the touch sensitive display unit 110 situating at the bottom of the transparent cover unit 120. In this case, the digital device 100 can control the second sensitivity in consideration of the thickness of the transparent cover unit 120. As an example, if the thickness of the transparent cover unit 120 is getting thicker, it may be difficult for the digital device 100 to detect a touch input of a user. As the thickness of the transparent cover unit 120 increases, the digital device 100 can increase the touch sensitivity.

Figure 6A:
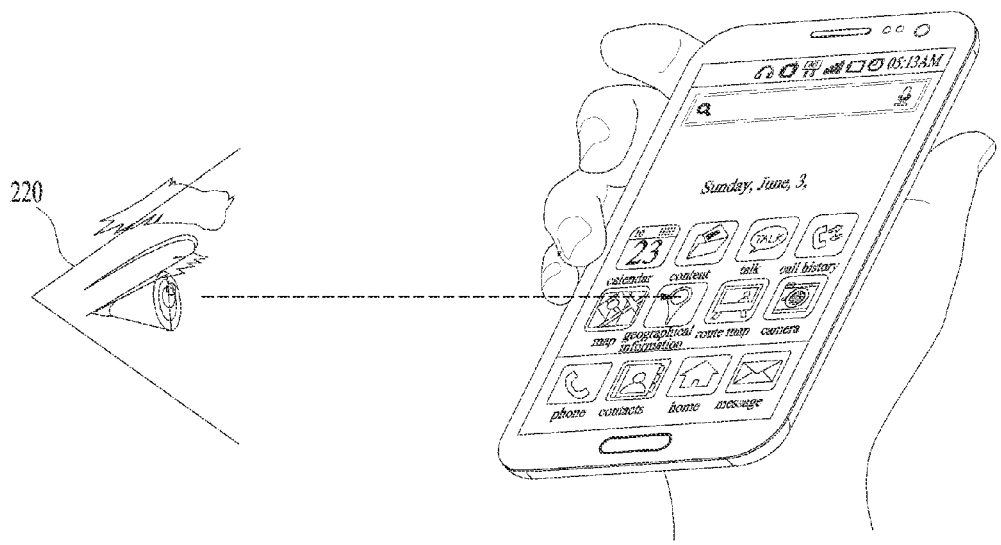
FIG. 6a to FIG. 6c is a diagram for a method for a digital device to execute touch compensation according to one embodiment of the present specification.
Figure 6A:
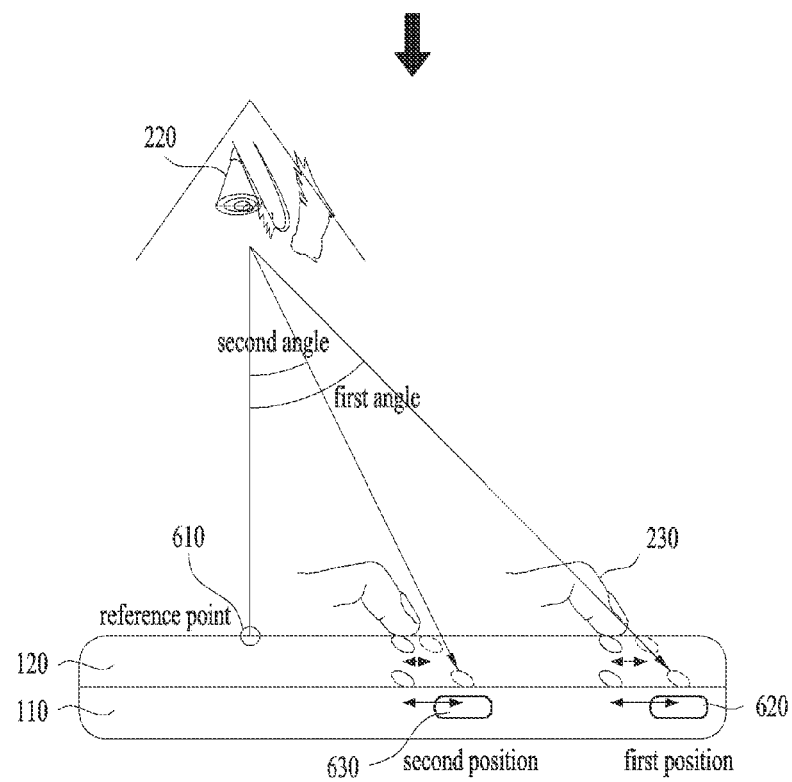
Figure 6B:
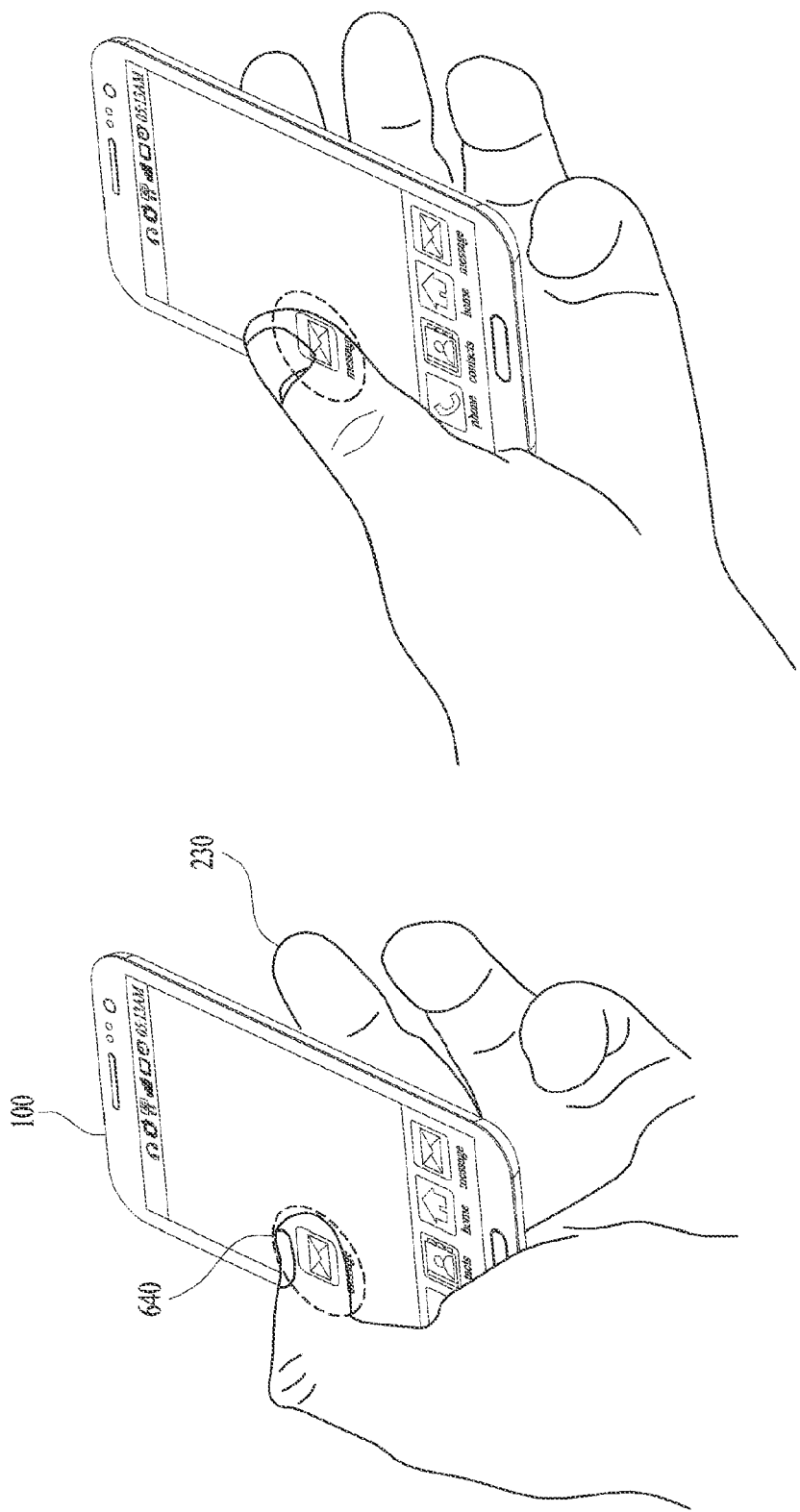
Figure 6C:
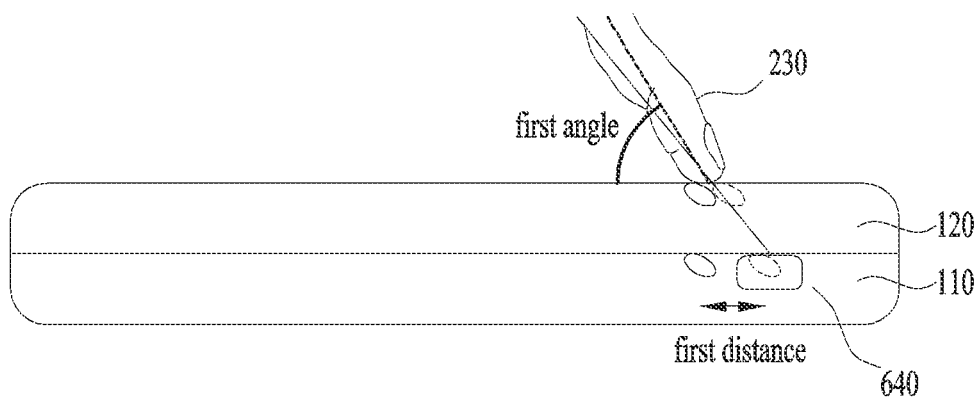
Figure 6C:
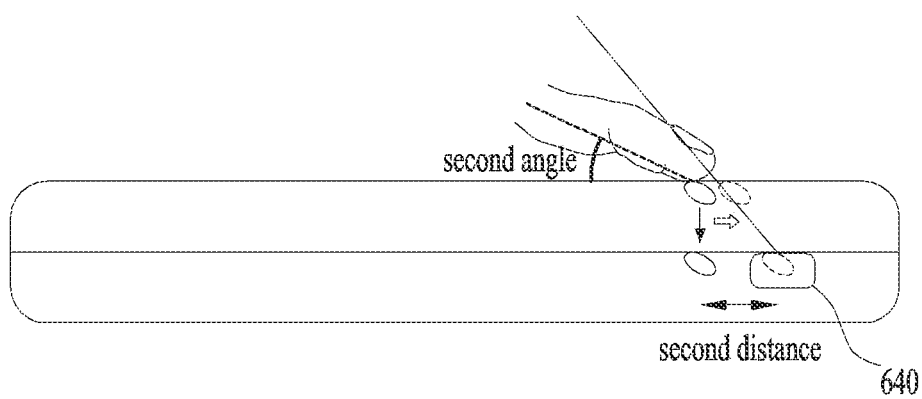

FIG. 6a to FIG. 6c is a diagram for a method for a digital device to execute touch compensation according to one embodiment of the present specification.

The digital device 100 can execute touch compensation based on a position on which a touch input is detected. In this case, the digital device 100 can detect the position on which the touch input is detected based on a reference point 610. If the detected touch input is located at a position far from the reference point 610, the digital device 100 may execute the touch compensation some more. In this case, the reference point 610 may correspond to a point predetermined by a user or the digital device 100. As an example, the reference point 610 may correspond to a point where the touch compensation is not necessary. More specifically, the reference point 610 may correspond to a point where a position at which eyes 220 of a user are gazing and a position touched by a hand 230 of the user are identical to each other. In particular, among an internal area of the touch sensitive display unit 110, the digital device 100 can configure a point forming a right angle with the eyes 220 of the user as the reference point 610. In particular, the digital device 100 detects a gaze of the user and may be then able to configure the reference point 610 based on the detected gaze. And, as an example, the digital device 100 can configure the reference point by a point at which the gaze of the user is mostly arrived among the touch sensitive display unit 110. More specifically, instead of detecting the gaze of the user whenever the reference point is configured, the digital device 100 can configure the point at which the gaze of the user is mostly arrived as the reference point 610.

And, as an example, the digital device 100 can configure a center of the digital device 100 as the reference point 610. And, the digital device 100 can configure the reference point 610 in consideration of a size of the touch sensitive display unit 110. In particular, the digital device 100 can configure the reference point 610 in various ways. Hence, the present specification may be non-limited by the aforementioned embodiment.

If the digital device 100 is configured by the open position, the digital device 100 can detect a touch input for controlling first visual information 620 displayed in a first position on a point away from the first position as much as a first distance. And, the digital device 100 can detect a touch input for controlling second visual information 630 displayed in a second position on a point away from the second position as much as a second distance. In this case, if the first position is located at a point farther than the second point from the reference point, the digital device 100 can configure the first distance to be longer than the second distance. In particular, the digital device 100 can execute first touch compensation based on a position in which visual information is displayed on the basis of the reference point 610.

In this case, the reference point 610 may correspond to a point where a position at which eyes 220 of a user are gazing and a position touched by a hand 230 of the user are identical to each other. As an example, among an internal area of the touch sensitive display unit 110, the digital device 100 can configure a point forming a right angle with the eyes 220 of the user and a position within a threshold angle range from the right angle as the reference point 610. In this case, a first angle may correspond to an angle formed by the first visual information 620 displayed in the first position and the gaze of the user. A second angle may correspond to an angle formed by the second visual information 630 displayed in the second position and the gaze of the user. In this case, if the first position is located at a point farther than the second point from the reference point 610, the first angle may be larger than the second angle. In this case, as an angle of gazing at visual information becomes larger, a difference between a position at which the user is gazing and a position on which the user is touching may increases. In particular, if the angle of gazing at the visual information becomes large, the digital device can detect a touch input on a position far from a position in which the visual information is displayed. Hence, the digital device 100 can configure the first distance to be longer than the second distance.

And, as an example, if the digital device is configured by the closed position, the digital device 100 may execute compensation to which compensation based on a thickness of the transparent cover unit 120 is added. More specifically, the aforementioned first and the second distance may increase in proportion to the thickness of the transparent cover unit 120. In particular, the digital device 100 can execute touch compensation based on the position in which the visual information is displayed and the thickness of the transparent cover unit 120 in the closed position.

And, the digital device 100 can execute the touch compensation based on an angle between a finger of a user and the digital device 100. More specifically, referring to FIG. 6c, if the user touches the digital device 100 in a manner of horizontally maintaining a finger 230 of the user, a position difference between a position at which the user is gazing and a position on which the user is touching may become large. On the contrary, if the user touches the digital device 100 in a manner of vertically maintaining the finger 230 of the user, the position difference between the position at which the user is gazing and the position on which the user is touching may become small. In particular, as the angle between the finger of the user and the digital device 100 is getting large, the digital device 100 can execute less touch compensation. In this case, the angle between the finger of the user and the digital device 100 could be maximized in a right angle.

More specifically, referring to FIG. 6c, if the digital device is configured by the open position, the digital device 100 can execute the touch compensation based on the angle between the finger of the user and the digital device 100. In this case, the angle between the finger of the user and the digital device 100 may correspond to an angle formed by the digital device 100 and the finger of the user.

As an example, the digital device 100 can detect a touch input touching a first touch point 640. In this case, if an angle formed by the finger of the user and the first touch point 640 corresponds to a first angle, the digital device can detect the touch input touching the first touch point 640 on a position away from the first touch point 640 as much as a first distance. And, if an angle formed by the finger of the user and the first touch point 640 corresponds to a second angle, the digital device can detect the touch input touching the first touch point 640 on a position away from the first touch point 640 as much as a second distance. In this case, if the first angle is larger than the second angle, the first distance may be shorter than the second distance. In this case, the first and the second angle may have a largest value in a right angle. In particular, if the user vertically touches the first touch point 640, the user may touch a position away from the first touch point 640 as much as a short distance. In particular, the digital device 100 can detect a touch input on the position away from the first touch point 640 as much as the short distance. On the contrary, if the user horizontally touches the first touch point 640, the user may touch a position away from the first touch point 640 as much as a long distance. In particular, the digital device 100 can detect a touch input on the position away from the first touch point 640 as much as the long distance. Hence, if the first angle, which corresponds to the angle formed by the finger of the user and the first touch point 640, is larger than the second angle, the digital device 100 can configure the first distance to be shorter than the second distance.

And, as an example, if the digital device is configured by the closed position, the digital device 100 may execute compensation to which compensation based on a thickness of the transparent cover unit 120 is added. More specifically, the aforementioned first and the second distance may increase in proportion to the thickness of the transparent cover unit 120. In particular, the digital device 100 can increase the first and the second distance based on the angle between the first touch point 640 and the finger of the user and the thickness of the transparent cover unit 120 in the closed position.

Figure 7:
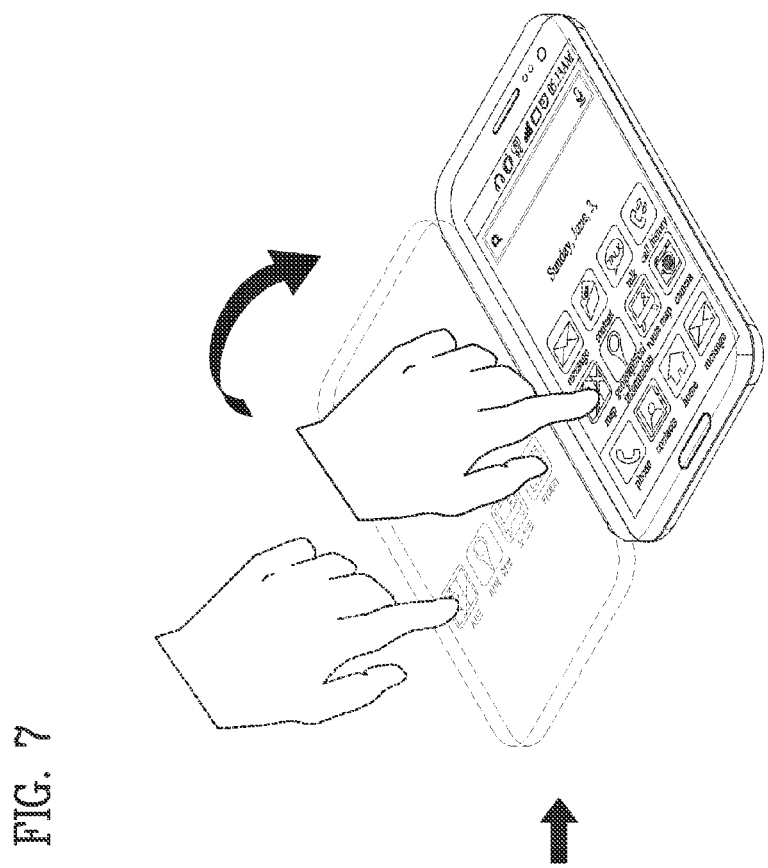
FIG. 7 is a diagram for a method for a digital device to control a transparent cover unit displaying visual information according to one embodiment of the present specification.
Figure 7:
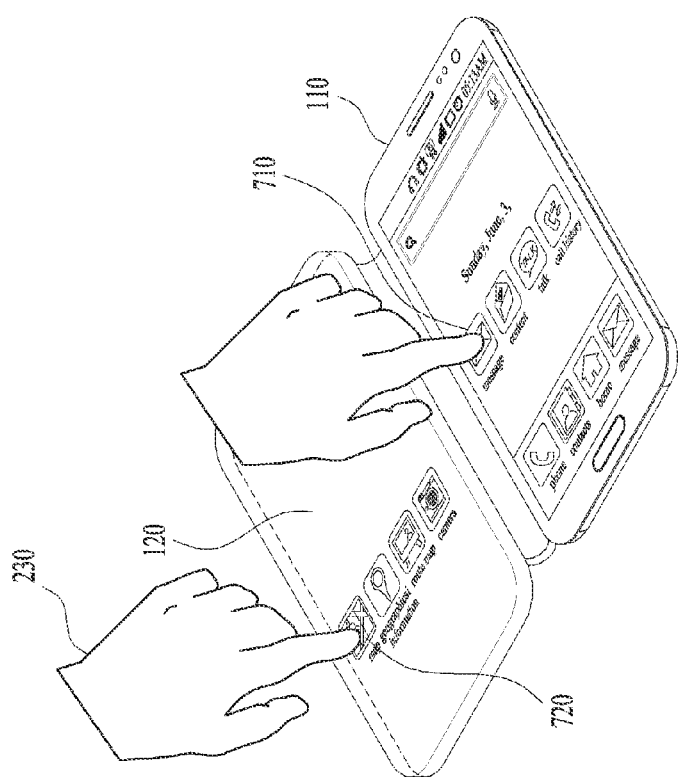

FIG. 7 is a diagram for a method for a digital device to control a transparent cover unit displaying visual information according to one embodiment of the present specification.

The transparent cover unit 120 may correspond to a touch sensitive transparent cover unit displaying visual information and detecting a touch input of a user. More specifically, the transparent cover unit 120 can detect a touch input irrespective of the touch sensitive display unit 110. And, the transparent cover unit 120 can display visual information irrespective of the touch sensitive display unit 110. In this case, if the digital device is configured by the open position, the digital device 100 can display first visual information 710 in the touch sensitive display unit 110. The digital device 100 can control the first visual information 710 displayed in the touch sensitive display unit 110 by a first touch input. And, the digital device 100 can display second visual information 720 in the transparent cover unit 120. The digital device 100 can control the second visual information 720 displayed in the transparent cover unit 120 by a second touch input. In particular, in case that the digital device is configured by the open position, the digital device can control the first visual information 710 displayed in the touch sensitive display unit 110 and the second visual information 720 displayed in the transparent cover unit 120, respectively.

In this case, if the digital device 100 detects a touch input using the transparent cover unit 120, the digital device 100 detects the touch input on a fourth position and can execute touch compensation, which alters location information of the touch input detected on the fourth position 510 to a fifth position. In this case, the fourth position and the fifth position can be located on the top of the transparent cover unit 120. The touch compensation for the transparent cover unit 120 may be identical to the touch compensation for the touch sensitive display unit 120 in the open position. More specifically, the digital device detects a touch input on a first position of the touch sensitive display unit 110 in the open position and can execute touch compensation, which alters location information of the touch input detected on the first position to a second position. In this case, if the fourth position and the first position overlap each other in the closed position, the digital device 100 can configure a distance between the fourth position and the fifth position to be identical to a distance between the first position and the second position.

And, in case that the digital device is configured by the closed position, the digital device 100 can display first visual information 710 in the touch sensitive display unit 110. And, the digital device 100 can display second visual information 720 in the transparent cover unit 120. In this case, as an example, if the display device is configured by the closed position, a user can touch the transparent cover unit 120 which is overlapped with the touch sensitive display unit 110. Hence, the digital device can detect a touch input touching the top of the transparent cover unit 120. In this case, if the digital device 100 detects a user input touching the transparent cover unit 120 in a position corresponding to the first visual information 710, the digital device 100 can detect a first touch input for controlling the first visual information 710 by the touch sensitive display unit 110. In this case, the digital device can execute touch compensation for the first touch input.

If the digital device 100 detects a user input touching the transparent cover unit 120 in a position corresponding to the second visual information 720, the digital device 100 can detect a second touch input for controlling the second visual information 720 by the transparent cover unit 120. In this case, the digital device can execute touch compensation for the second touch input.

Figure 8A:
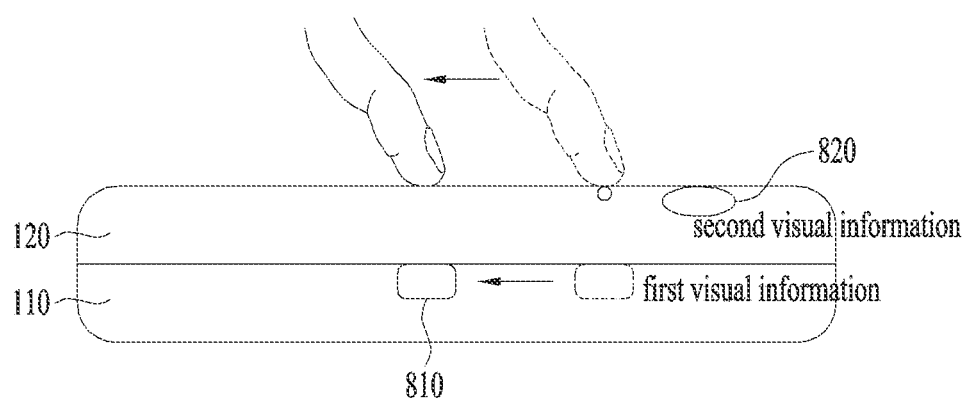
FIG. 8a to FIG. 8c is a diagram for a method for a digital device to control first visual information and second visual information according to one embodiment of the present specification in case that a transparent cover unit displays the second visual information.
Figure 8A:
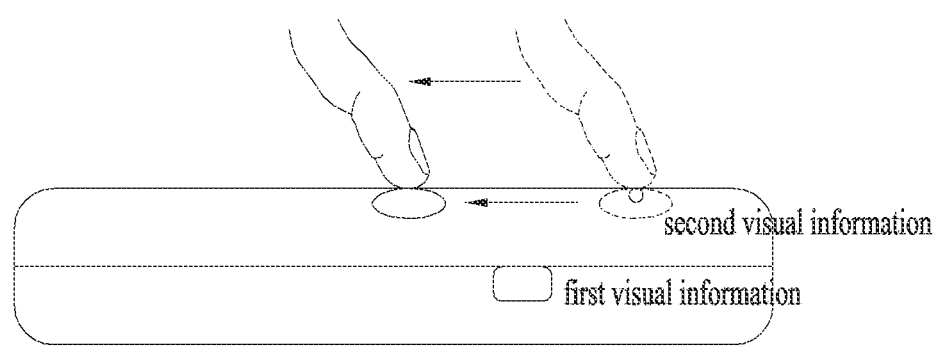
Figure 8B:
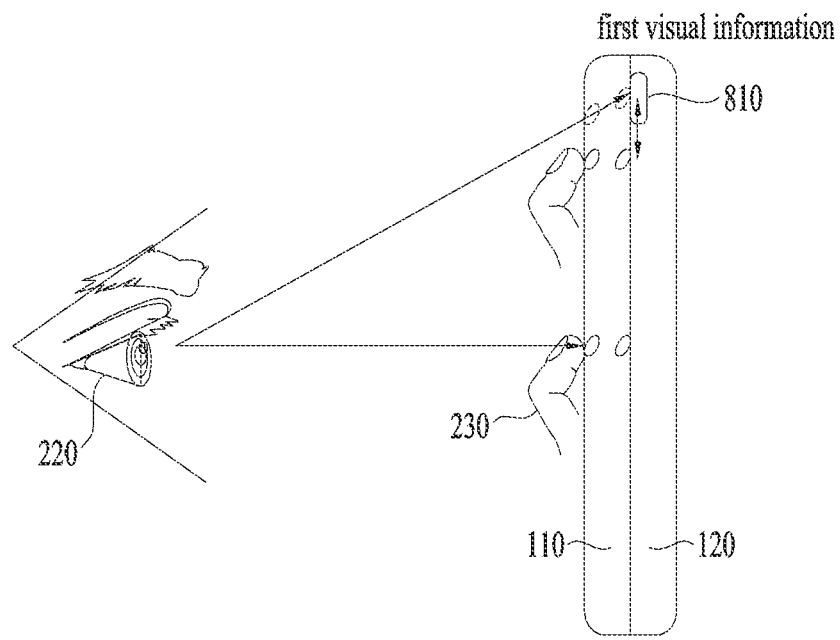
Figure 8B:
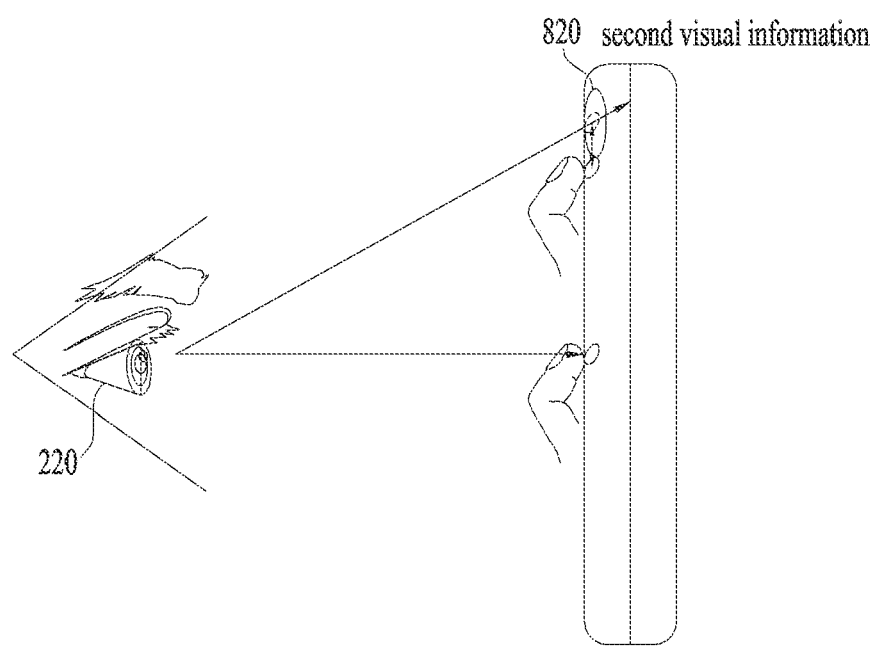
Figure 8C:
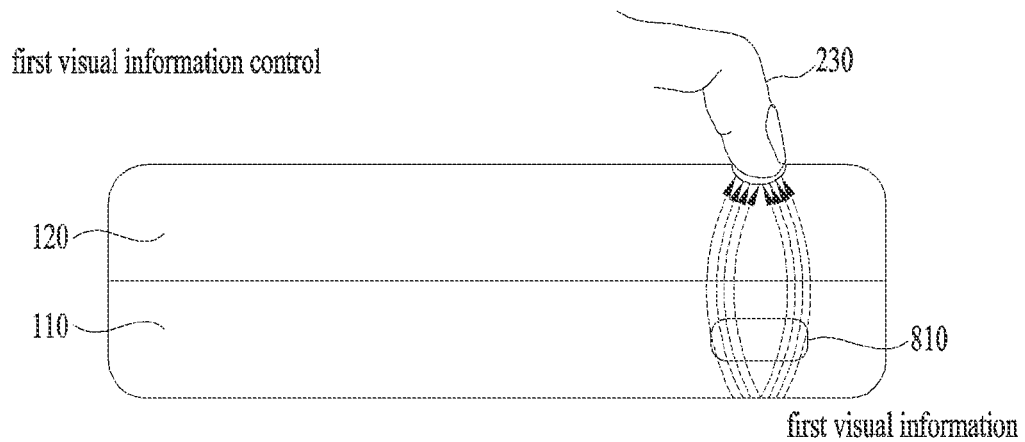
Figure 8C:
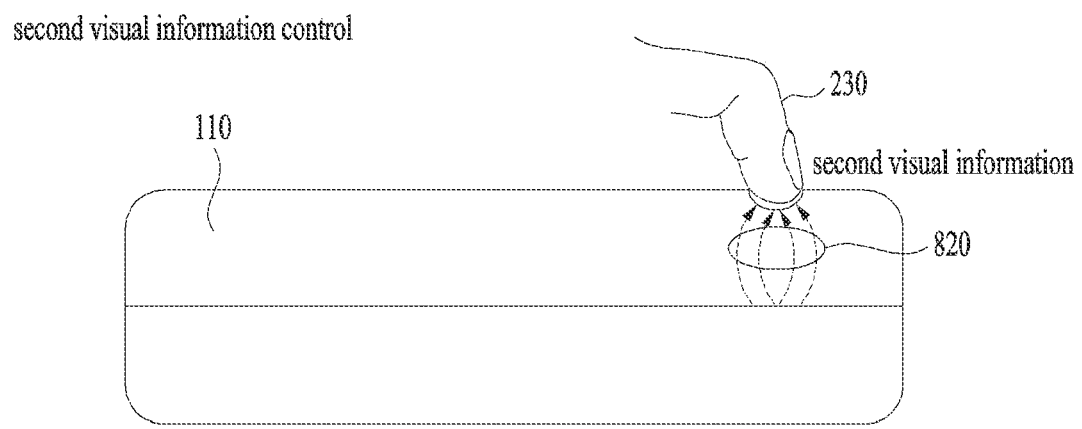

FIG. 8*a* to FIG. 8*c* is a diagram for a method for a digital device to control first visual information and second visual information according to one embodiment of the present specification in case that a transparent cover unit displays the second visual information.

The digital device 100 can execute touch compensation for a first touch input controlling the first visual information in the open position.

If the transparent cover unit 120 displays second visual information 820, the digital device 100 can detect a second touch input touching the second visual information 820 by the transparent cover unit 120. In this case, the digital device 100 can control the second visual information 820 by the second touch input. If the digital device 100 detects the second touch input, the digital device 100 can execute touch compensation for the second touch input.

If the digital device 100 is configured by the closed position, the digital device 100 can display first visual information 810 in the touch sensitive display unit 110. And, the digital device 100 can display the second visual information 820 in the transparent cover unit 120. In this case, if the digital device 100 detects a touch input touching the top of the transparent cover unit 120 in a position corresponding to the first visual information 810, the digital device 100 can detect the touch input by the touch sensitive display unit 110 as a first touch input. And, if the digital device 100 detects a touch input touching the top of the transparent cover unit 120 in a position corresponding to the second visual information 820, the digital device 100 can detect the touch input by the transparent cover unit 120 as a second touch input.

In this case, referring to FIG. 8*b*, if the digital device 100 detects the first touch input touching the first visual information 810, the digital device 100 can execute touch compensation. In this case, the touch compensation may correspond to compensation executed by the digital device 100 in consideration of both a position in which the first visual information 810 is displayed and a thickness of the transparent cover unit 120. And, if the digital device 100 detects the second touch input touching the second visual information 820, the digital device 100 can execute touch compensation. In this case, the touch compensation may correspond to compensation executed by the digital device 100 in consideration of a position in which the second visual information 820 is displayed.

Referring to FIG. 8c, the digital device 100 can detect the first touch input touching the first visual information 810 by a first sensitivity. The digital device 100 can detect the second touch input touching the second visual information 820 by a second sensitivity. In this case, the first sensitivity may correspond to sensitivity higher than the second sensitivity.

Figure 9A:
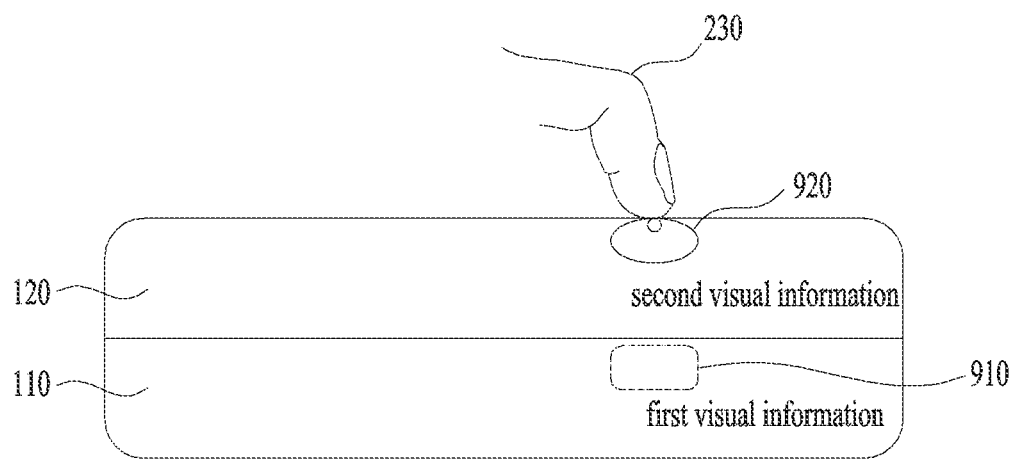
FIG. 9a to FIG. 9b is a diagram for a method for a digital device to control first visual information and second visual information according to one embodiment of the present specification in case that the first visual information and the second visual information are displayed in a manner of being overlapped with each other.
Figure 9A:
Figure 9A:
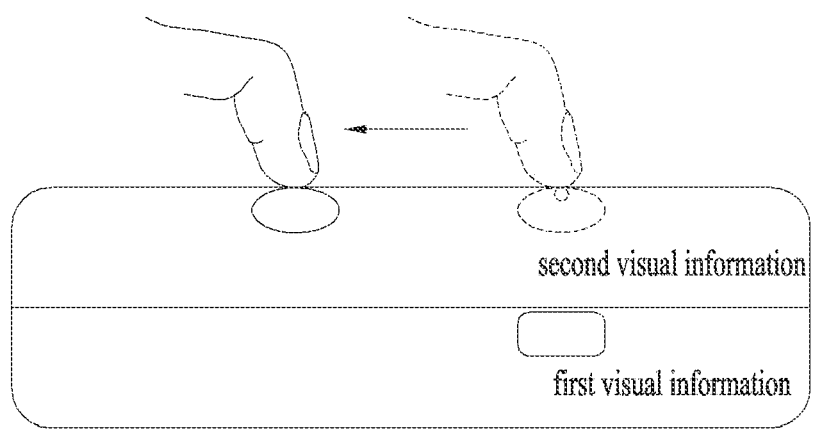
Figure 9B:
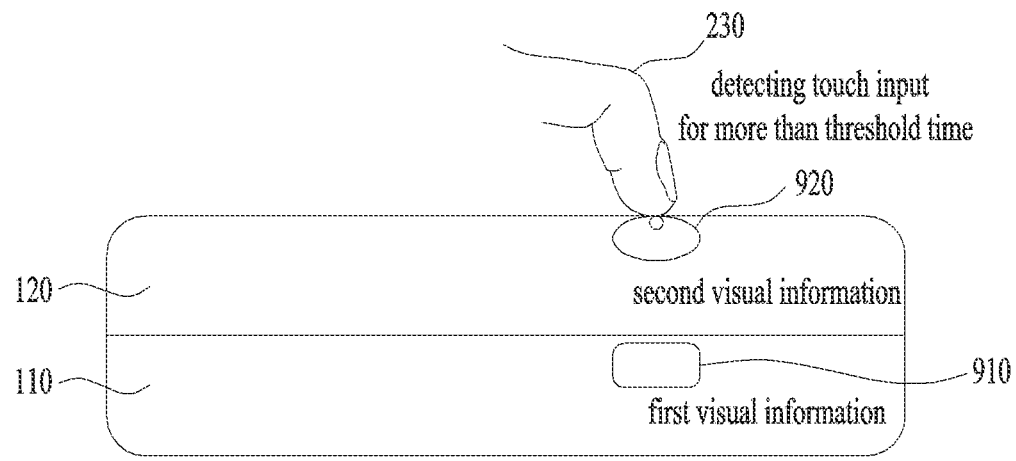
Figure 9B:
Figure 9B:
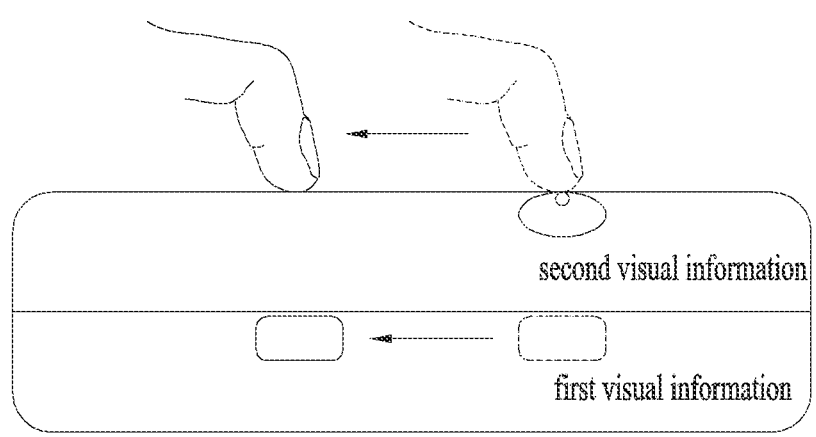

FIG. 9a to FIG. 9b is a diagram for a method for a digital device to control first visual information and second visual information according to one embodiment of the present specification in case that the first visual information and the second visual information are displayed in a manner of being overlapped with each other.

If the digital device is configured by the closed position, the first visual information 910 and the second visual information 920 may overlap each other. More specifically, the transparent cover unit 120 can display the second visual information 920 and the touch sensitive display unit 110 can display the first visual information 910. In this case, as an example, the display device 100 can display both the first visual information 910 and the second visual information 920 in a state that the first visual information 910 and the second visual information 920 overlap each other.

In case that the digital device 100 displays both the first visual information 910 and the second visual information 920 in a manner of overlapping the first visual information 910 and the second visual information 920 each other, the digital device 100 can configure a touch input touching the top of the transparent cover unit 120 in an overlapped position as a touch input for controlling the second visual information. In particular, when the first visual information 910 and the second visual information 920 are displayed in a manner of being overlapped with each other, the display device 100 can preferentially control the second visual information 920.

And, as an example, referring to FIG. 9b, if the digital device detects a touch input touching the top of the transparent cover unit for more than a threshold time in a position where the first visual information 910 and the second visual information 920 overlap each other, the digital device 100 can detect a first touch input controlling the first visual information 910. In this case, the threshold time may correspond to a threshold time making a user control the first visual information 910 and may have a prescribed error. And, as an example, if the digital device detects a touch input touching the top of the transparent cover unit by a pressure greater than a threshold pressure in a position where the first visual information 910 and the second visual information 920 overlap each other, the digital device 100 can detect a first touch input controlling the first visual information 910. In this case, the threshold pressure may correspond to a threshold pressure making a user control the first visual information 910 and may have a prescribed error. In particular, when the first visual information 910 and the second visual information 920 are displayed in a manner of being overlapped with each other, the display device 100 can configure touch inputs controlling the overlapped first visual information 910 and the second visual information 920, respectively.

FIG. 10 is a flowchart for a digital device to execute touch compensation according to one embodiment of the present specification.

The digital device 100 can detect a touch input on a first position of the touch sensitive display unit 110 [S1010]. As mentioned earlier in FIG. 1, the first position can be located at the touch sensitive display unit 110. More specifically, the first position can be determined on the basis of a reference point situating at the top of the touch sensitive display unit 110. In this case, the reference point may correspond to a point in which compensation for a touch input is not executed. As an example, the reference point can be configured by a position where an angle formed by a gaze of a user and the digital device 100 is within a threshold angle range. In this case, the threshold angle range corresponds to a threshold angle range and may include a right angle. More specifically, the digital device 100 can configure an area including a prescribed range as the reference point on the basis of a position where the gaze of the user and the digital device 100 form a right angle. As an example, the reference point may correspond to a point where there is no error between a position detected by eyes of a user and a position touched by a hand of the user. In particular, in case that the user touches while gazing visual information, the user may touch a point identical to a point at which the user is gazing. In this case, if the position on which the touch input is detected is far from the reference point, the digital device 100 may execute more touch compensations. More specifically, if the position on which the touch input is detected is far from the reference point, the digital device 100 can detect a touch input of the user in a position far from the position on which the touch input is detected.

Subsequently, the digital device can detect whether the transparent cover unit 120 is put on the top of the touch sensitive display unit 110 [S1020]. In this case, as mentioned earlier in FIG. 1, the transparent cover unit 120 and the display unit 110 may overlap each other. In this case, a user can touch the touch sensitive display unit 110 in a state that the transparent cover unit 120 is overlapped. The digital device 100 can detect a touch input of a user touching the touch sensitive display unit 110 in the state the transparent cover unit 120 is overlapped. In this case, as an example, the transparent cover unit 120 may correspond to a transparent plastic cover. And, the transparent cover unit 120 may correspond to a cover made from a transparent flexible material. And, the transparent cover unit 120 may correspond to a cover made from a transparent film material. And, the transparent cover unit 120 may correspond to a component connected with the touch sensitive display unit 110 by a folding unit. In this case, the folding unit may correspond to a part connecting the touch sensitive display unit 110 and the transparent cover unit 120 in the digital device, which is manufactured in foldable fashion. In particular, the transparent cover unit 120 may correspond to a cover made from a transparent material and capable of being overlapped with the display unit 120, by which the present specification may be non-limited.

And, the transparent cover unit 120 may correspond to a touch sensitive transparent cover unit displaying visual information and detecting a touch input of a user. More specifically, the transparent cover unit 120 can display visual information irrespective of the touch sensitive display unit 110. The transparent cover unit 120 can detect a touch input of a user irrespective of the touch sensitive display unit 110. In particular, the digital device can detect touch inputs for controlling the touch sensitive display unit 110 and the transparent cover unit 120, respectively.

Subsequently, if the transparent cover unit 120 is not put on the top of the touch sensitive display unit 110, the digital device can configure it as an open position [S1030]. In this case, as mentioned earlier in FIG. 1, the digital device 100 can control a touch input touching the touch sensitive display unit 110 irrespective of the transparent cover unit 120. In particular, the open position may correspond to a mode for detecting a touch input touching the touch sensitive display unit 110 in a state that the transparent cover unit 120 and the touch sensitive display unit do not overlap each other.

Subsequently, if the digital device 100 is configured by the open position, the digital device 100 can alter location information of a touch input detected on the first position to a second position [S1040]. In this case, as mentioned earlier in FIG. 5b, if the digital device is configured by the open position, the digital device 100 can execute touch compensation based on a position of the visual information displayed in the touch sensitive display unit 110. In this case, the digital device 100 can alter the touch input detected on the first position to the second position. In this case, the first and the second position can be determined based on the reference point. More specifically, the digital device 100 can place the reference point, the first position, and the second position on an identical line. And, the second position may be located at a direction receding from the reference point in the first position.

Subsequently, if the transparent cover unit 120 is put on the top of the touch sensitive display unit 110, the digital device can configure it as a closed position [S1050]. In this case, as mentioned earlier in FIG. 1, the digital device 100 can compensate for a touch input touching the touch sensitive display unit 110 based on a thickness of the transparent cover unit 110. More specifically, in case that the digital device 100 executes compensation for the touch input in the closed position, the digital device 100 can execute touch compensation in a manner of adding compensation, which is executed based on the thickness of the transparent cover unit 110 in the open position, to the touch compensation. In particular, the closed position may correspond to a mode for detecting a touch input touching the touch sensitive display unit 110 in a state that the transparent cover unit 120 is overlapped with the touch sensitive display unit. Hence, the digital device 100 can detect a touch input of a user in a manner of passing through the transparent cover unit 120 situating at the top of the touch sensitive display unit 110.

Subsequently, if the digital device is configured by the closed position, the digital device 100 can alter location information of a touch input detected on the first position to a third position [S1060]. In this case, as mentioned earlier in FIG. 5b, if the digital device is configured by the closed position, the digital device 100 can execute touch compensation based on a position of the touch input detected on the touch sensitive display unit 110. In this case, the digital device 100 can execute compensation in consideration of the thickness of the transparent cover unit 120. In particular, the digital device 100 can configure the third position to be placed at a farther position from the reference point compared to the second position compensated in the open position.

More specifically, if the digital device is configured by the closed position, the digital device 100 can execute touch compensation for location information of the touch input detected on the first position based on the thickness of the transparent cover unit 120. In this case, if the thickness of the transparent cover unit 120 increases, the digital device can configure the third position to be placed at a farther position from the first point on the basis of the reference point.

And, the digital device 100 can differently configure sensitivity for touch inputs of a user. More specifically, the digital device 100 can detect a touch input by a first sensitivity in the open position. The digital device 100 can detect a touch input by a second sensitivity in the closed position. In this case, the digital device can configure the second sensitivity to have sensitivity higher than the first sensitivity. In particular, the processor 130 can more sensitively detect a touch input in the closed position.

For clarity of explanation, each diagram is explained in a manner of being divided. Yet, it is possible to design a new embodiment to implement the new embodiment by combining the embodiments, which are described in each of the diagrams. And, according to the necessity of those skilled in the art, designing a recording media readable by the computer, which has recorded a program for executing the previously explained embodiments, also belongs to a scope of a right.

A digital device 100 and a method of controlling therefor according to the present specification may not limitedly apply to the composition and method of the aforementioned embodiments. The aforementioned embodiments may be configured in a manner of being selectively combined the whole of the embodiments or a part of the embodiments to achieve various modifications.

Meanwhile, a digital device 100 and a method of controlling therefor according to the present specification can be implemented with a code readable by a processor in a recording media readable by the processor, which is equipped in a network device. The recording media readable by the processor may include all kinds of recording devices for storing data capable of being read by the processor. The examples of the recording media readable by the processor may include a ROM, a RAM, a magnetic tape, a floppy disc, an optical data storing device and the like. And, implementing in a form of a carrier wave such as a transmission via the internet and the like is also included. And, since the recording media readable by the processor are distributed to the computers connected by a network, codes readable by the processor can be stored and executed in a manner of being distributed.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

And, both an apparatus invention and a method invention are explained in the present specification and the explanation on both of the inventions can be complementally applied, if necessary.

What is claimed is:

1. A digital device, comprising:
a touch sensitive display unit configured to detect a touch input;
a transparent cover unit, wherein the transparent cover unit is positioned in an open position or a closed position and is overlapped with the touch sensitive display unit in the closed position; and
a processor configured to control the touch sensitive display unit,
wherein the processor is further configured to:

detect the touch input on a first position of the touch sensitive display unit and detect an angle of a finger touching the first position, when the transparent cover unit is in the open position, alter location information of the touch input detected on the first position to a second position, and control a first distance between the first position and the second position to decrease as the detected angle of the finger touching the first position increases, and when the transparent cover unit is in the closed position, alter the location information of the touch input detected on the first position to a third position, control a second distance between the first position and the third position to decrease as the detected angle of the finger touching the first position increases, and control the second distance between the first position and the third position to increase in proportion to a thickness of the transparent cover unit, if in the closed position, the touch sensitive display unit displays a first visual information and the transparent cover unit displays a second visual information such that the first visual information and the second visual information overlap each other, the controller regards a touch input touching the top of the transparent cover unit in an overlapped position as a touch input for controlling the second visual information.

2. The digital device of claim 1, wherein the second distance between the first position and the third position exceeds the first distance between the first position and the second position.

3. The digital device of claim 1, wherein the processor is further configured to:

when the transparent cover unit is in the open position, detect the touch input of the first position by a first sensitivity, and when the transparent cover unit is in the closed position, detect the touch input of the first position by a second sensitivity.

4. The digital device of claim 3, wherein the processor is further configured to change a sensitivity of the second touch sensitivity based on a thickness of the transparent cover unit.

5. The digital device of claim 1, wherein the processor is further configured to detect a reference distance between a reference point of the touch sensitive display unit and the first position.

6. The digital device of claim 5, wherein a distance between the first position and the second position increases as the detected reference distance increases when the transparent cover unit is in the open position, and wherein a distance between the first position and the third position increases as the detected reference distance increases when the transparent cover unit is in the closed position.

7. The digital device of claim 5, wherein the processor is further configured to:

when the first position and the altered second position are identical to each other and the first position and the altered third position are identical to each other, set the first position to the reference point.

8. The digital device of claim 5, wherein the processor is further configured to detect a gaze of a user positioned in front of the digital device, wherein the reference point is set to a position where an angle between the digital device and the gaze of the user is within a threshold angle range, and wherein the threshold angle range includes a right angle.

9. The digital device of claim 5, wherein the second position and the third position are positioned at a first direction based on the first position, and wherein the first direction corresponds to a direction further apart from the reference point.

10. The digital device of claim 1, wherein the touch sensitive display unit is configured to display visual information.

11. The digital device of claim 10, wherein the processor is further configured to:

when the transparent cover unit is in the open position, control the visual information displayed in the second position with the touch input detected on the first position, and when the transparent cover unit is in the closed position, control the visual information displayed in the third position with the touch input detected on the first position.

12. The digital device of claim 1, wherein the third position is set in proportion to a thickness of the transparent cover unit.

13. The digital device of claim 1, wherein the transparent cover unit corresponds to a touch sensitive transparent cover unit configured to detect a touch input.

14. The digital device of claim 13, wherein the processor is further configured to:

detect the touch input on a fourth position of the touch sensitive transparent cover unit using the touch sensitive transparent cover unit, and alter location information of the touch input detected on the fourth position to a fifth position.

15. The digital device of claim 14, wherein the fourth position corresponds to the first position and is overlapped with the first position when the touch sensitive transparent cover unit is in the closed position.

16. The digital device of claim 15, wherein the processor is further configured to set a distance between the altered fifth position and the fourth position and a distance between the altered second position and the first position to be identical to each other.

17. The digital device of claim 15, wherein the processor is further configured to:

when the transparent cover unit is in the closed position, detect a touch input touching the fourth position for more than a threshold time using the touch sensitive display unit.

18. The digital device of claim 1, wherein if the controller detects the touch input touching the top of the transparent cover unit for more than a threshold time or by a pressure greater than a threshold pressure in a position where the first visual information and the second visual information overlap each other, the controller regards the touch input as a touch input for controlling the first visual information.

* * * * *